US012673765B2

(12) United States Patent　(10) Patent No.: US 12,673,765 B2
Depenbusch et al.　(45) Date of Patent:　Jul. 7, 2026

(54) ELECTRIC VERTICAL TAKE-OFF AND LANDING AIRCRAFT GAMING APPARATUS AND METHODS

(71) Applicant: Archer Aviation Inc., San Jose, CA (US)

(72) Inventors: Nathan Thomas Depenbusch, Mountain View, CA (US); Jeffery Scott Greenwood, Boulder Creek, CA (US)

(73) Assignee: Archer Aviation Inc., San Jose, CA (US)

( * ) Notice: Subject to any disclaimer, the term of this patent is extended or adjusted under 35 U.S.C. 154(b) by 189 days.

(21) Appl. No.: 18/499,075

(22) Filed: Oct. 31, 2023

(65) Prior Publication Data

US 2024/0140590 A1　May 2, 2024

Related U.S. Application Data

(63) Continuation of application No. 18/325,628, filed on May 30, 2023, now Pat. No. 11,840,324, which is a
(Continued)

(51) Int. Cl.
*B64C 13/00*　(2006.01)
*B64C 13/04*　(2006.01)
(Continued)

(52) U.S. Cl.
CPC ........ *B64C 13/0421* (2018.01); *B64C 13/503* (2013.01); *B64D 27/34* (2024.01); *G05D 1/0858* (2013.01)

(58) Field of Classification Search
CPC .............. B64C 13/0421; B64C 13/503; B64C 29/0033; G05D 1/0858; B64D 27/34; B64D 31/04
See application file for complete search history.

(56) References Cited

U.S. PATENT DOCUMENTS

| | | |
|---|---|---|
| 5,001,646 A | 3/1991 | Caldwell et al. |
| 6,885,917 B2 | 4/2005 | Osder et al. |

(Continued)

FOREIGN PATENT DOCUMENTS

| | | |
|---|---|---|
| EP | 3891067 B1 | 1/2024 |
| WO | 2020180373 A2 | 9/2020 |

OTHER PUBLICATIONS

Walker, G., et al., "F-35B Integrated Flight-Propulsion Control Development", 2013 international powered lift conference, 2013, 15 pages.

(Continued)

*Primary Examiner* — Ian Jen
(74) *Attorney, Agent, or Firm* — Finnegan, Henderson, Farabow, Garrett & Dunner, LLP

(57)　ABSTRACT

Disclosed are electric vertical take-off and landing (eVTOL) aircraft gaming apparatuses and methods. In one embodiment, a video game apparatus comprises a processor, a first inceptor, communicatively coupled to the processor, the first inceptor configured to accept longitudinal and lateral linear movements as manual input and provide corresponding signals to the processor, and a second inceptor, communicatively coupled to the processor, the second inceptor configured to accept longitudinal and lateral linear movements as manual input and provide corresponding signals to the processor, wherein the processor is configured to control a heading of an aircraft in a video game using a signal received from the second inceptor corresponding to lateral linear movement of the second inceptor. Some embodiments may additionally include at least one sensor and a thumb stick for each inceptor.

48 Claims, 9 Drawing Sheets

Related U.S. Application Data continuation of application No. 18/147,640, filed on Dec. 28, 2022, now Pat. No. 11,702,191.

(60) Provisional application No. 63/381,567, filed on Oct. 30, 2022.

(51) Int. Cl.
B64C 13/50 (2006.01)
B64D 27/34 (2024.01)
G05D 1/00 (2006.01)

(56) References Cited

U.S. PATENT DOCUMENTS

| | | | |
|---|---|---|---|
| 7,438,259 | B1 | 10/2008 | Piasecki et al. |
| 8,948,936 | B2 | 2/2015 | Shue et al. |
| 9,898,033 | B1 | 2/2018 | Long |
| 10,183,738 | B2 | 1/2019 | Arnold |
| 10,843,796 | B2 | 11/2020 | Marvin et al. |
| 11,312,480 | B2 | 4/2022 | Gillett et al. |
| 11,694,568 | B2 * | 7/2023 | Guthrie ................. G09B 9/085 |
| | | | 434/30 |
| 12,006,023 | B2 | 6/2024 | Starr et al. |
| 2002/0153452 | A1 | 10/2002 | King et al. |
| 2004/0093130 | A1 | 5/2004 | Osder et al. |
| 2010/0076625 | A1 | 3/2010 | Yoeli |
| 2010/0320314 | A1 | 12/2010 | Balaskovic |
| 2013/0138270 | A1 | 5/2013 | Christensen et al. |
| 2016/0023755 | A1 | 1/2016 | Elshafei et al. |
| 2016/0091894 | A1 * | 3/2016 | Zhang .................... B64U 10/13 |
| | | | 701/2 |
| 2017/0010611 | A1 * | 1/2017 | Tao ...................... G09B 19/165 |
| 2017/0060128 | A1 | 3/2017 | Matloff |
| 2018/0101180 | A1 | 4/2018 | Greenfield et al. |
| 2018/0241936 | A1 * | 8/2018 | Li ........................ G05D 1/0011 |
| 2019/0332125 | A1 | 10/2019 | Irwin, III et al. |
| 2020/0333805 | A1 | 10/2020 | English et al. |
| 2021/0061444 | A1 | 3/2021 | Ahmad et al. |
| 2022/0019248 | A1 * | 1/2022 | Zhu .......................... G05D 1/12 |
| 2022/0041267 | A1 | 2/2022 | De Freitas et al. |
| 2022/0266983 | A1 | 8/2022 | Starr et al. |
| 2022/0269267 | A1 * | 8/2022 | Lesonen .............. G05D 1/0038 |
| 2023/0162610 | A1 * | 5/2023 | Beaudouin-Lafon ........................ |
| | | | B64D 43/00 |
| | | | 701/3 |

OTHER PUBLICATIONS

Vigano, L., et al., "Development of augmented control laws for a tilt rotor in low and high speed flight modes", European Rotorcraft Forum, 2017, 14 pages.

Denham, J., et al., "Converging on a precision Hover control strategy for the F-35B STOVL aircraft.", AIAA Guidance, Navigation and Control Conference and Exhibit, 2006, 13 pages.

Whittle, R., "Flying The Osprey Is Not Dangerous, Just Different: Veteran Pilots", Breaking Defense, Sep. 5, 2012, 11 pages.

Kang, Y., et al., "Development of flight control system and troubleshooting on flight test of a tilt-rotor unmanned aerial vehicle", International Journal of Aeronautical and Space Sciences 17.1, 2016, p. 120-131, 12 pages.

Dollinger, D., et al., "Control Inceptor Design for Onboard Piloted Transition VTOL Aircraft Considering Simplified Vehicle Operation", AIAA SciTech Forum 11-15 & 19-21, Jan. 2021, 11 pages.

Raab, S., et al, "Proposal of a Unified Control Strategy for Vertical Take-Off and Landing Transitiion Aircraft Configurations", AIAA Aviation Forum, Jun. 25-29, 2018, 21 pages.

Fehrm, B., "Flight Control, Part 3", Leeham News and Analysis, Mar. 25, 2016, 3 pages.

Harris, F., "Introduction to Autogyos, Helicopters, and Other V/STOL Aircraft, vol. III: Other V/STOL Aircraft", NASA, Nov. 2015, 810 pages.

Lombaerts, T. et al., "Control Concepts for Simplified Vehicle Operations of a Quadrotor eVTOL Vehicle", AIAA Aviation Forum, Jun. 15-19, 2020, 32 pages.

Doo, J. et al., "NASA Electric Vertical Takeoff and Landing (eVTOL) Aircraft Technology for Public Services—A White Paper: NASA Transformative Vertical Flight Working Group 4 (TVF4)", NASA Aug. 2021, 63 pages.

Brown, R.E., "Are eVTOL Aircraft inherently more susceptible to the Vortex Ring State than Conventional Helicopters?", Sophrodyne aerospace 2022, 18 pages.

Thurber, M., "Hands On: Flying the Joby Simulator" AINonline, Dec. 2021, 5 pages.

"How We Reinvented Flight Controls for the Joby eVTOL Aircraft", eVTOL innovation, 2021, https://www.youtube.com/watch?v=60ocd_6g2Vg.

"Flying the Joby eVTOL Simulator", AOPA Pilot Video 2022, https://www.youtube.com/watch?v=3w6jtKI2ymA.

Raab, S. et al., (2018). "Proposal of a Unified Control Strategy for Vertical Take-off and Landing Transition Aircraft Configurations". 10.2514/6.2018-3478.

Dollinger, D. et al., (2021). "Control Inceptor Design for Onboard Piloted Transition VTOL Aircraft Considering Simplified Vehicle Operation", 10.2514/6.2021-1896.

Lobl, D. et al., "Control Inceptor Design for Onboard Piloted Transition VTOL Aircraft Considering Simplified Vehicle Operation", AIAA SciTech Forum, Jan. 20, 2021.

International Search Report and Written Opinion of the International Search Authority in counterpart International Application No. PCT/US2023/078153 dated Mar. 13, 2024 (9 pages).

* cited by examiner

500

| | | HOVER 410 | TRANSITION 420 | CTOL 430 |
|---|---|---|---|---|
| LEFT LONGITUDINAL | Inceptor Command | Longitudinal Inertial Speed | Airspeed Rate | Airspeed Rate |
| | Hold (in detent) | Longitudinal Position | Airspeed | Airspeed |
| | Primary Response | Propeller Nacelle Tilt with Minimal Pitch Motion | Propeller Nacelle Tilt and Propeller Speed | Propeller Speed |
| LEFT LATERAL | Inceptor Command | Lateral Inertial Speed | Lateral Air-Relative Speed | Lateral Air-Relative Speed |
| | Hold (in detent) | Lateral Position | Turn-Coordination | Turn-Coordination |
| | Primary Response | Roll Angle | Propeller Speed, Rudder Deflection, and Compensating Roll | Rudder Deflection (Propeller Speed for Large Commands) |
| RIGHT LONGITUDINAL | Inceptor Command | Vertical Speed | Flight Path Angle Rate | Flight Path Angle Rate |
| | Hold (in detent) | Altitude | Flight Path Angle | Flight Path Angle |
| | Primary Response | Propeller Speed, No Attitude Change | Propeller Speed and Pitch Attitude Change | Propeller Speed and Pitch Attitude Change |
| RIGHT LATERAL | Inceptor Command | Turn-Rate (Hover Turn) | Turn-Rate (Banked Turn) | Turn-Rate (Banked Turn) |
| | Hold (in detent) | Heading | Heading | Heading |
| | Primary Response | Asymmetric Propeller Nacelle Tilt | Roll Angle | Roll Angle |

*FIG. 5*

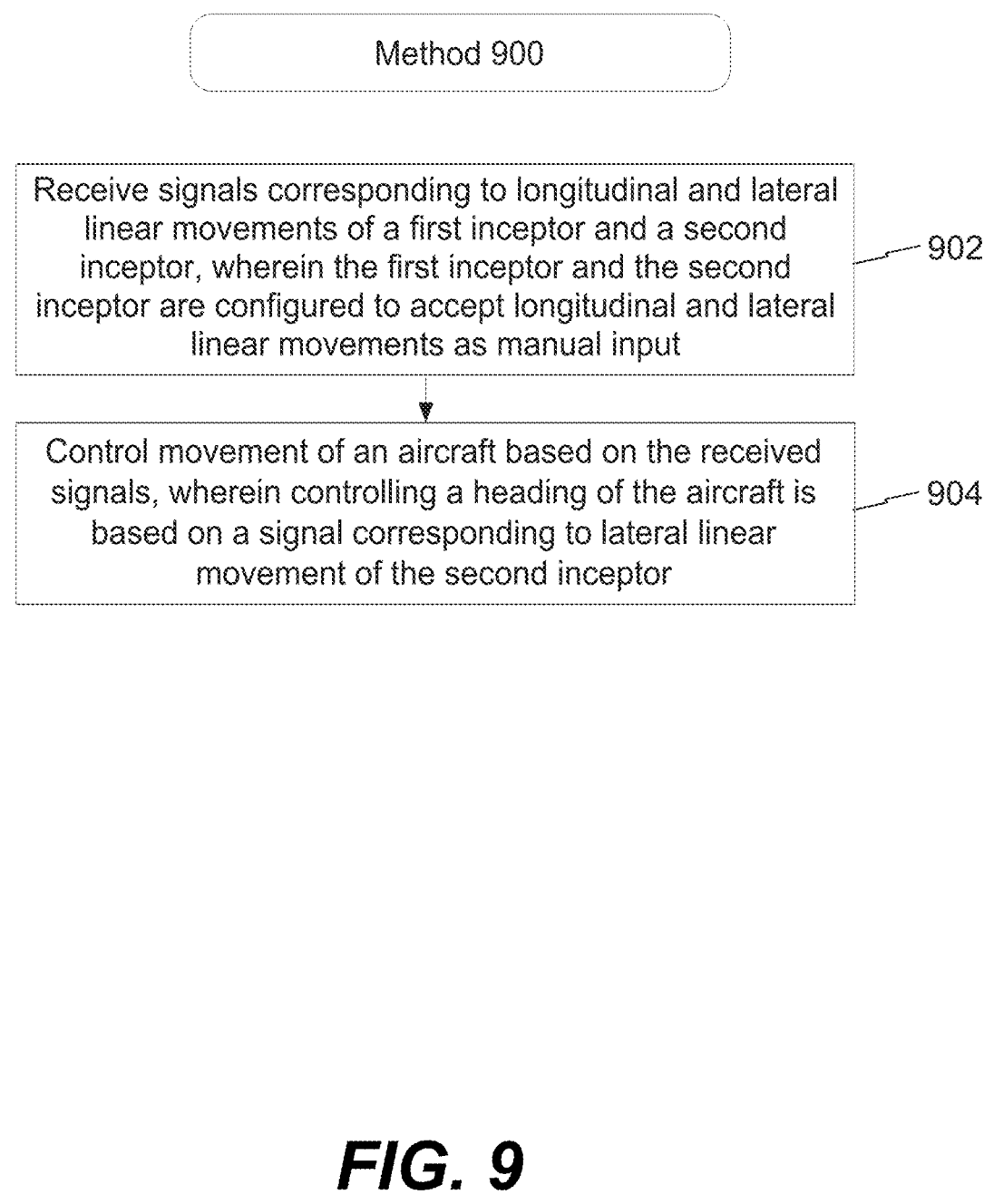

Method 900

Receive signals corresponding to longitudinal and lateral linear movements of a first inceptor and a second inceptor, wherein the first inceptor and the second inceptor are configured to accept longitudinal and lateral linear movements as manual input — 902

Control movement of an aircraft based on the received signals, wherein controlling a heading of the aircraft is based on a signal corresponding to lateral linear movement of the second inceptor — 904

FIG. 9

ELECTRIC VERTICAL TAKE-OFF AND LANDING AIRCRAFT GAMING APPARATUS AND METHODS

PRIORITY CLAIM

The present application is a continuation under 35 U.S.C. § 120 of U.S. Non-Provisional patent application Ser. No. 18/325,628, filed May 30, 2023, titled "SYSTEMS AND METHODS FOR SIMULATING AN ELECTRIC VERTICAL TAKE-OFF AND LANDING AIRCRAFT", which in turn is a continuation under 35 U.S.C. § 120 of U.S. Non-Provisional patent application Ser. No. 18/147,640, filed Dec. 28, 2022, titled "SYSTEMS AND METHODS FOR CONTROLLING AN ELECTRIC VERTICAL TAKE-OFF AND LANDING AIRCRAFT," issued as U.S. Pat. No. 11,702,191, which in turn claims priority under 35 U.S.C. § 119 to U.S. Provisional Patent Application No. 63/381,567, filed Oct. 30, 2022, titled "SYSTEMS AND METHODS FOR CONTROLLING AN ELECTRIC VERTICAL TAKE-OFF AND LANDING AIRCRAFT". The entire contents of the aforementioned applications are incorporated herein by reference for all purposes.

TECHNICAL FIELD

This disclosure relates generally to the field of powered aerial vehicles. More particularly, and without limitation, the present disclosure relates to innovations in electric vertical take-off and landing (eVTOL) aircraft that use electrical propulsion systems. Certain aspects of the present disclosure generally relate to inceptor controls for eVTOL aircraft. Other aspects of the present disclosure generally relate to improvements in accuracy and safety that may be used in other types of vehicles but provide particular advantages in aerial vehicles.

SUMMARY

One aspect of the present disclosure is directed to a flight control apparatus comprising a processor, a first inceptor, communicatively coupled to the processor, the first inceptor configured to accept longitudinal and lateral linear movements as manual input and provide corresponding signals to the processor, and a second inceptor, communicatively coupled to the processor, the second inceptor configured to accept longitudinal and lateral linear movements as manual input and provide corresponding signals to the processor, wherein the processor is configured to control a heading of an aircraft using a signal received from the second inceptor corresponding to lateral linear movement of the second inceptor.

Another aspect of the present disclosure is directed to a simulator apparatus comprising a processor, a first inceptor, communicatively coupled to the processor, the first inceptor configured to accept longitudinal and lateral linear movements as manual input and provide corresponding signals to the processor, and a second inceptor, communicatively coupled to the processor, the second inceptor configured to accept longitudinal and lateral linear movements as manual input and provide corresponding signals to the processor, wherein the processor is configured to control a heading of an aircraft using a signal received from the second inceptor corresponding to lateral linear movement of the second inceptor.

Yet another aspect of the present disclosure is directed to a video game apparatus comprising a processor, a first inceptor, communicatively coupled to the processor, the first inceptor configured to accept longitudinal and lateral linear movements as manual input and provide corresponding signals to the processor, and a second inceptor, communicatively coupled to the processor, the second inceptor configured to accept longitudinal and lateral linear movements as manual input and provide corresponding signals to the processor, wherein the processor is configured to control a heading of an aircraft using a signal received from the second inceptor corresponding to lateral linear movement of the second inceptor.

Yet another aspect of the present disclosure is directed to a method of operating a flight inceptor. The method includes receiving signals corresponding to longitudinal and lateral linear movements of a first inceptor and a second inceptor, wherein the first inceptor and the second inceptor are configured to accept longitudinal and lateral linear movements as manual input, and controlling movement of an aircraft based on the received signals, wherein controlling a heading of the aircraft is based on a signal corresponding to lateral linear movement of the second inceptor.

Other systems and methods are discussed herein.

BRIEF DESCRIPTION OF FIGURES

FIG. 5 shows an exemplary control mapping associated with the inceptors, consistent with disclosed embodiments.

FIG. 9 shows an exemplary method for controlling an aircraft, consistent with disclosed embodiments.

DETAILED DESCRIPTION

Figure 1:
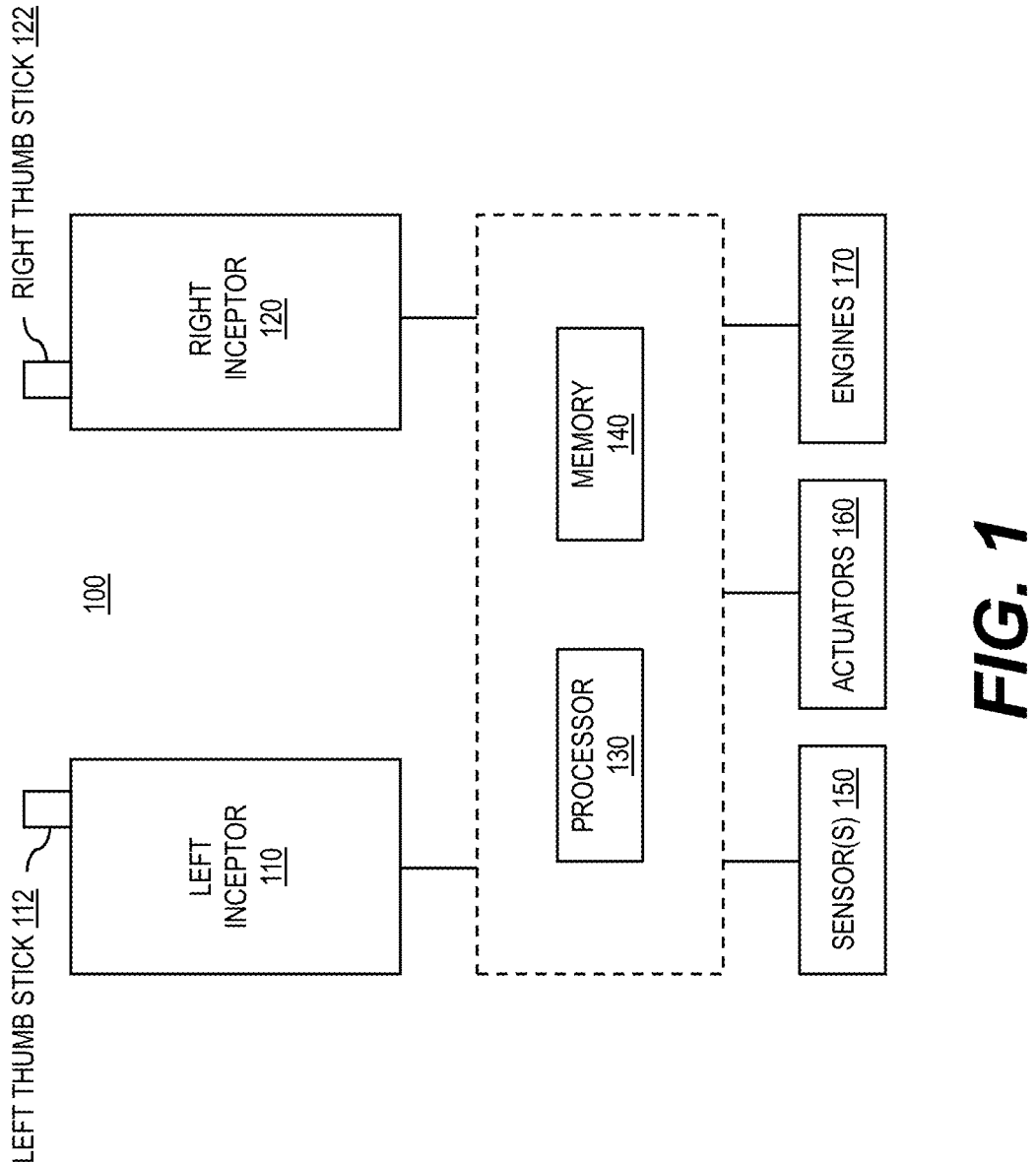
FIG. 1 shows a block diagram of an exemplary flight control apparatus, consistent with disclosed embodiments.

The present disclosure addresses components of eVTOL aircraft primarily for use in a non-conventional aircraft. For example, the eVTOL aircraft of the present disclosure may be intended for frequent (e.g., over 50 flights per work day), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations. For example, the Federal Aviation Administration enforces federal laws and regulations requiring safety components such as fire protective barriers adjacent to engines that use more than a threshold amount of oil or other flammable materials.

In preferred embodiments, the distributed electrical propulsion system may include twelve electrical engines, which may be mounted on booms forward and aft of the main wings of the aircraft. The forward electrical engines may be tiltable mid-flight between a horizontally oriented position (e.g., to generate forward thrust) and a vertically oriented position (e.g., to generate vertical lift). The forward electrical engines may be of a clockwise type or counterclockwise type in terms of direction of propeller rotation. The aft electrical engines may be fixed in a vertically oriented position (e.g., to generate vertical lift). They may also be of a clockwise type or counterclockwise type in terms of direction of propeller rotation. In some embodiments, an aircraft may possess various combinations of forward and aft electrical engines. For example, an aircraft may possess six forward and six aft electrical engines, four forward and four aft electrical engines, or any other combination of forward and aft engines, including embodiments where the number of forward electrical engines and aft electrical engines are not equivalent.

In preferred embodiments, for a vertical takeoff and landing (VTOL) mission, the forward electrical engines as well as aft electrical engines may provide vertical thrust during takeoff and landing. During flight phases where the aircraft is in forward flight-mode, the forward electrical engines may provide horizontal thrust, while the propellers of the aft electrical engines may be stowed at a fixed position in order to minimize drag. The aft electrical engines may be actively stowed with position monitoring. Transition from vertical flight to horizontal flight and vice-versa may be accomplished via the eVTOL aircraft subsystem. The eVTOL aircraft subsystem may redirect thrust between a primarily vertical direction during vertical flight mode to a mostly horizontal direction during forward-flight mode. A variable pitch mechanism may change the forward electrical engine's propeller-hub assembly blade collective angles for operation during the hover-phase, transition phase, and cruise-phase.

In some embodiments, in a conventional takeoff and landing (CTOL) mission, the forward electrical engines may provide horizontal thrust for wing-borne take-off, cruise, and landing. In some embodiments, the aft electrical engines may not be used for generating thrust during a CTOL mission and the aft propellers may be stowed in place.

In some embodiments, an electric engine may be housed or connected to a boom of an aircraft and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller. In some embodiments, the motor, gearbox, and inverter may be interfaced such that a coolant, such as oil, may be used to service the motor, inverter, and/or gearbox, while sharing a common heat exchanger. In some embodiments, the amount of oil used to lubricate and cool the electric engine may vary, including amounts less than one quart, two quarts, three quarts, or any other measured amount of oil.

In some embodiments, an eVTOL aircraft system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, an eVTOL aircraft system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the eVTOL aircraft system to maintain a propulsion system orientation with the help of, or without, additional power being provided by the system.

In some embodiments, a flight control system may include an electric engine and propeller dynamic compensation and stabilization function. For aircraft relying on changing propeller speed to change thrust for primary or secondary control of its dynamics, the rate and bandwidth at which propeller speed can be changed may be critical. If bandwidth is too low, the aircraft may have difficulty in rejecting exogenous disturbances (gusts, etc.) and may appear "sluggish" to a pilot or outer loop control system. Therefore, the flight control system may use knowledge of the low-order model of a relevant propeller, engine and gearbox dynamics to calculate a torque required to give a propeller and the resulting thrust a desired response shape to commands. The bandwidth of a propeller connected to an electric engine may be determined largely by the inertia of rotating components, the gear ratio of the gearbox (if present), the aerodynamics of the propeller, the density altitude of operation, and both the speed and incidence angle of surrounding air. In some embodiments, the electric engine and propeller dynamic compensation and stabilization function may compute the torque command output based on physical limits (e.g., torque capability, maximum and minimum rotational speed, etc.).

In some embodiments, the flight control system may be configured to use flight control laws to convert movements of one or more inceptors into electrical signals that are transmitted to cause physical movements of aircraft control surfaces. In some embodiments, the flight control system may include a flight control envelope protection function to prioritize protections and reject pilot commands in excess of protected values and regulatory requirements.

In some embodiments, an electrical propulsion system as described herein may generate thrust by supplying High Voltage (HV) electric power to an electric engine, which in turn converts HV power into mechanical shaft power which is used to rotate a propeller. As mentioned above, an aircraft as described herein may possess multiple electric engines which are boom-mounted forward and aft of the wing. The amount of thrust each electric engine generates may be governed by a torque command from the Flight Control System (FCS) over a digital communication interface to each electric engine. Embodiments may include forward electric engines, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, an aircraft may include aft engines, or lifters, that can be of a clockwise (CW) type or counterclockwise (CCW) type. Additional embodiments may include aft electric engines that utilize a multi-blade fixed pitch propeller.

As described herein, the orientation and use of electric propulsion systems may change throughout the operation of the aircraft. In some embodiments, during vertical takeoff and landing, the forward propulsion systems as well as aft propulsion systems may provide vertical thrust during take-off and landing. During the flight phases where the aircraft is in forward flight-mode, the forward propulsion systems may provide horizontal thrust, while the aft propulsion system propellers may be stowed at a fixed position in order to minimize drag. The aft electric propulsion systems may be actively stowed with position monitoring. Some embodiments may include a transition from vertical flight to horizontal flight and vice-versa. In some embodiments, the transitions may be accomplished via the eVTOL aircraft system. The eVTOL aircraft system redirects thrust between a primarily vertical direction during vertical flight mode to a mostly horizontal direction during forward-flight mode. Additional embodiments may include a variable pitch mechanism that may change the forward propulsion system propeller-hub assembly blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing. The aft electronic engines are not used for generating thrust during a CTOL mission and the aft propellers are stowed in place.

In some embodiments, an electrical engine as described herein may possess design features which mitigate and protect against uncontained fire, such as utilizing less than one quart, or another non-hazardous quantity, of flammable fluid contained in both the tilt and lift engines, not possessing a nominal ignition source within the electric engines, possessing an engine over temperature operating limit that may be more than 50° C. less than a flammable fluid auto-ignition temperature, overtemperature detection and protection, overvoltage detection and protection, and overcurrent detection and protection. In some embodiments, the design features of the electrical engine may deem it to not be a designated fire zone.

As disclosed herein, an electrical engine may include an inverter and motor; or inverter, gearbox, and motor across various configurations, such as representative configurations as described herein. For example, an electrical engine may include an electrical motor, gearbox, and inverter that all share the same central axis. Additionally, the central axis may be configured along an axis of an output shaft going to the propeller of the aircraft. In such an exemplary configuration, the motor, gearbox, and inverter would all share the output shaft as a central axis and would be circularly oriented around the output shaft. Additional embodiments may include a motor, gearbox, and inverter that are mounted together in a sequence, or a configuration where some of the components are mounted together, such as the motor and gearbox, and another component is located elsewhere, such as the inverter, but wiring systems are used to connect the electrical engine.

As mentioned above, an electrical engine for an aircraft as described here may include some or all of a motor, inverter, and gearbox. Various configurations may include an inverter and motor such that the output shaft of a motor directly provides the speed and torque for a propeller shaft. Additional embodiments of an electrical engine may include a motor, inverter, and a gearbox, wherein the output of a motor may travel through a gearbox that is connected to the output shaft for the propeller; a motor, inverter, and gearbox wherein the output from the motor travels away from the propeller, through a gearbox, where the output shaft for the propeller travels back through the gearbox and motor to the propeller. As described herein, an electrical engine may account for any combination or orientation of some or all of a motor, inverter, and gearbox. Additionally, each configuration or orientation of the electrical engine as disclosed herein may include cooling via air-cooling, coolant liquid, or a mixture of both.

For example, a configuration of an electrical engine may include a motor and inverter wherein the motor is in between the propeller of the aircraft and the inverter. Additionally, a motor may include a gearbox. Further, an inverter may share the same central axis as a motor wherein the inverter may be located in a housing that is cantilevered off of the rear of the motor and may be air cooled. It is recognized that such an inverter orientation would not be an optimum configuration in terms of the housing required to achieve such a cantilevered orientation. Additionally, a motor in this configuration utilizing air cooling may comprise potting material and air fins to assist with cooling of the motor may lead to an even larger increase in mass of the system.

Some embodiments may include an electrical engine, wherein inverter modules may be mounted on the outside of a motor housing. Additional embodiments may include an electrical engine wherein an inverter may be mounted on top of an electrical motor such that the air-cooling fins of the inverter are underneath the propeller. Further embodiments may include an inverter mounted to the back of a motor with air-cooling fins facing out radially, an inverter mounted to the front of a motor with the air-cooling fins facing out radially, an inverter mounted to a motor where the inverter is cooled by a liquid, such as oil, or any other position of the inverter relative to a motor.

Embodiments of an electrical motor may comprise a stator housing, a wound stator assembly, a rotor, various bearings, and any additional components such that to assist in transferring the speed and torque generated by the motor to a propeller.

It is understood that an electrical engine may generate heat during operation and may comprise a heat management system to ensure components of the electrical engine do not fail during operation. In some embodiments, coolant may be used and circulated throughout individual components of the engine, such as an inverter, gearbox, or motor, through some of the components, or through all of the components of the engine to assist with managing the heat present in the engine. Additional embodiments may include using air cooling methods to cool the electrical engine or using a mixture of coolant and air to manage the heat generated during operation in the electrical engine. In some embodiments, the coolant being used may also be the same liquid that is being used as lubricant throughout the inverter, gearbox, or motor. For example, the inverter, gearbox, and motor may be cooled using a liquid or air, or a mixture of air and liquid cooling could be used, such as cooling the motor using air cooling and using liquid cooling in the inverter and gearbox, or any other combination of air and liquid cooling across the inverter, gearbox, and motor or even subsets of those components.

In some embodiments, oil may be used as a lubricant throughout an electrical engine and may also be used as coolant fluid to assist in managing the heat generated by the engine during operation. Further to this example, different amounts of oil may be used to act as both lubricant and coolant fluid in the electrical engine, such as less than one quart, less than two quarts, or any other amount of oil needed to lubricate and cool the electrical engine, in combination with or without the assistance of air cooling. As has been disclosed herein, an electrical engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. It should be understood that the example embodiments as mentioned here in are representative and do not dictate the bounds of the amount of lubricant and coolant that may be used in an electrical engine.

It is understood that by using oil to not only lubricate the electrical engine but also cool the electrical engine rather than another coolant, additional oil will be added to the system, but that oil will remove traditional components that may be used to cool such an electrical engine. For example, if the electrical engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using less heat exchangers and potentially other components not being required, of the overall system and a more appealing drag profile may be present. Further, using one substance for the lubrication and cooling of the engine may increase efficiency of the system due to the reduction in mass and the benefits of cooling the engine with a substance rather than relying on air cooling which may have issues traveling throughout the engine.

Additional embodiments of electrical engines may possess various components to ensure any flammable fluids are monitored and prevented from entering certain sections of the electrical engine. Some embodiments may include an electric engine possessing a wet zone enclosure that may be defined by a gearbox, motor, and/or heat exchanger. In some embodiments, an electric engine may possess up to 4 liters of air within the motor-gearbox housing which is in contact with engine oil. Embodiments of a motor-gearbox housing may equalize internal and external pressure using a breather. Embodiments of a breather may include it protruding above nearby design features in order to prevent inadvertent entry of external fluids. Additional embodiments may include a breather that possesses a screen and a circuitous entry path to prevent entry of external debris. Embodiments may include a sight glass being present on both the tilt and lift electric engines in order to check that oil is not overfilled or underfilled during servicing.

Additional embodiments of electrical engines may include active protection features in the forward and aft electrical engines such as monitoring internal temperatures throughout the engine operation, including oil temperature, stator winding sets, inverter bulk capacitors, power modules, control board power modules, control board control processors, control board monitor processors, internal hot-spots, and other various locations throughout the engine. Embodiments may include overtemperature limits that take into account known failure temperatures and operating limits in relation to auto-ignition temperatures of fluids. Some embodiments may include a High Voltage Power System that may have fuses at the high voltage battery terminals which may rapidly disconnect the engine electrical connection irreversibly to mitigate overcurrent events. This overcurrent protection may be activated when the electric engine current draw is greater than the Overcurrent operating. As such, in some embodiments, failure conditions which lead to overcurrent may only lead to a transient overheating, arc or spark faults. Some embodiments may include a fire threat characterization test ignition source that may be selected to be a more severe ignition source than a short occurring in the electric engine and being opened by the engine fuse. In some embodiments, an inverter will detect AC overcurrent and isolate the erroneous phase and/or will continuously monitor input DC voltage, and will apply protective actions to keep voltages under the overvoltage operating limit.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

FIG. 1 illustrates components of an exemplary flight control apparatus 100, consistent with disclosed embodiments. As shown in FIG. 1, embodiments of a flight control apparatus for an aircraft may include inceptors 110 and 120 (e.g., joysticks, sticks, controllers, etc.), thumb sticks 112 and 122, at least one processor 130, at least one memory 140, one or more sensors 150, actuators 160, and engines 170. Inceptors 110 and 120 may be any input devices in the form of a stick, such as a joystick or an inceptor, configured to control movement of an aircraft via manual inputs (e.g., inceptor movements) received from a user (e.g., pilot). In some embodiments, the inceptors may be located at a specific position relative to a pilot of the aircraft. For example, one of the inceptors may be located to the left of the pilot (i.e., left inceptor 110) and the other inceptor may be located to the right of the pilot (i.e., right inceptor 120). In some embodiments, each inceptor may have one or more sensors integrated onto the inceptor configured to respond to a force applied via movement of the inceptor by generating and transmitting electronic signals corresponding to movement of the inceptor to processor 130. Additionally or alternatively, each inceptor may comprise a force-feedback component configured to receive control signals from a flight control computer of the flight control apparatus and to apply counter forces based on the received control signals. Thumb sticks 112 and 122, as discussed below, may be configured to act as beep inceptors. In some embodiments, thumb stick 112 or 122 may act as a replacement inceptor for its corresponding inceptor in response to receiving an override signal. Processor 130 may be any processing unit (e.g., computing device, microcontroller, microprocessor, system-on-chip, digital signal processor, etc.) configured to perform operations based on instructions stored in one or more memories, such as memory 140. Sensor(s) 150 may be any sensors configured to measure data associated with the aircraft. For example, one or more sensors 150 may be configured to measure one or more of an airspeed, ground-speed, temperature, acceleration(s), static pressure, angular rate, location (e.g., GPS), attitude, altitude, heading, etc. associated with the aircraft. Actuators 160 may include actuators that can be controlled to move flight control surfaces. Engines 170 may include propulsion engines, as discussed above.

In some embodiments, the flight control apparatus may include foot pedals (not pictured). Preferred embodiments of the flight control apparatus may not include foot pedals configured to control the heading via a yaw axis of the aircraft in flight. Additionally or alternatively, preferred embodiments of the flight control apparatus may include one or more foot pedals solely configured to control a braking function of the aircraft while the aircraft is on the ground via manual inputs (e.g., pushing on the foot pedal) received from a user (e.g., pilot). Additionally or alternatively, the one or more foot pedals may be configured for use during conventional take-off and landing (CTOL) operations. In some embodiments, the one or more foot pedals may each be configured to respond to a force applied via movement of the foot pedal by generating and transmitting electronic signals corresponding to movement of the foot pedal to processor 130.

Figure 2:
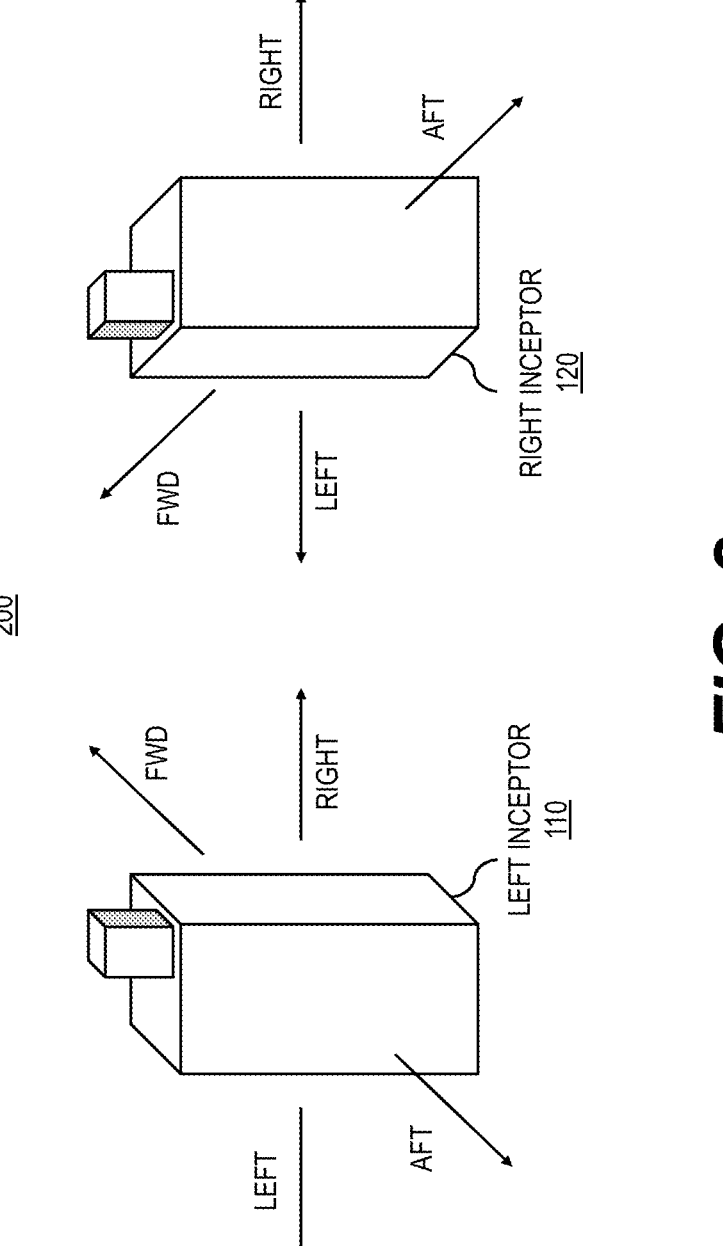
FIG. 2 illustrates exemplary movements of the inceptors, consistent with disclosed embodiments.

FIG. 2 shows a diagram 200 illustrating exemplary movements of the inceptors, consistent with disclosed embodiments. As shown in FIG. 2, in some embodiments, each inceptor may be configured to move longitudinally (i.e., up/forward and down/aft) and/or laterally (i.e., right and left) on a base, wherein each longitudinal and lateral movement and resulting inceptor position may be interpreted as a digital value to be input into the at least one processor and output as signals to various electrical and mechanical components of the aircraft. For example, based on the longitudinal and lateral movements of the inceptors, the at least one processor may be configured to output signals to change an amount of thrust provided to each motor. As another example, based on the longitudinal and lateral movements of the inceptors, the at least one processor may be configured to change a shape and/or orientation of airfoils.

Figure 3:
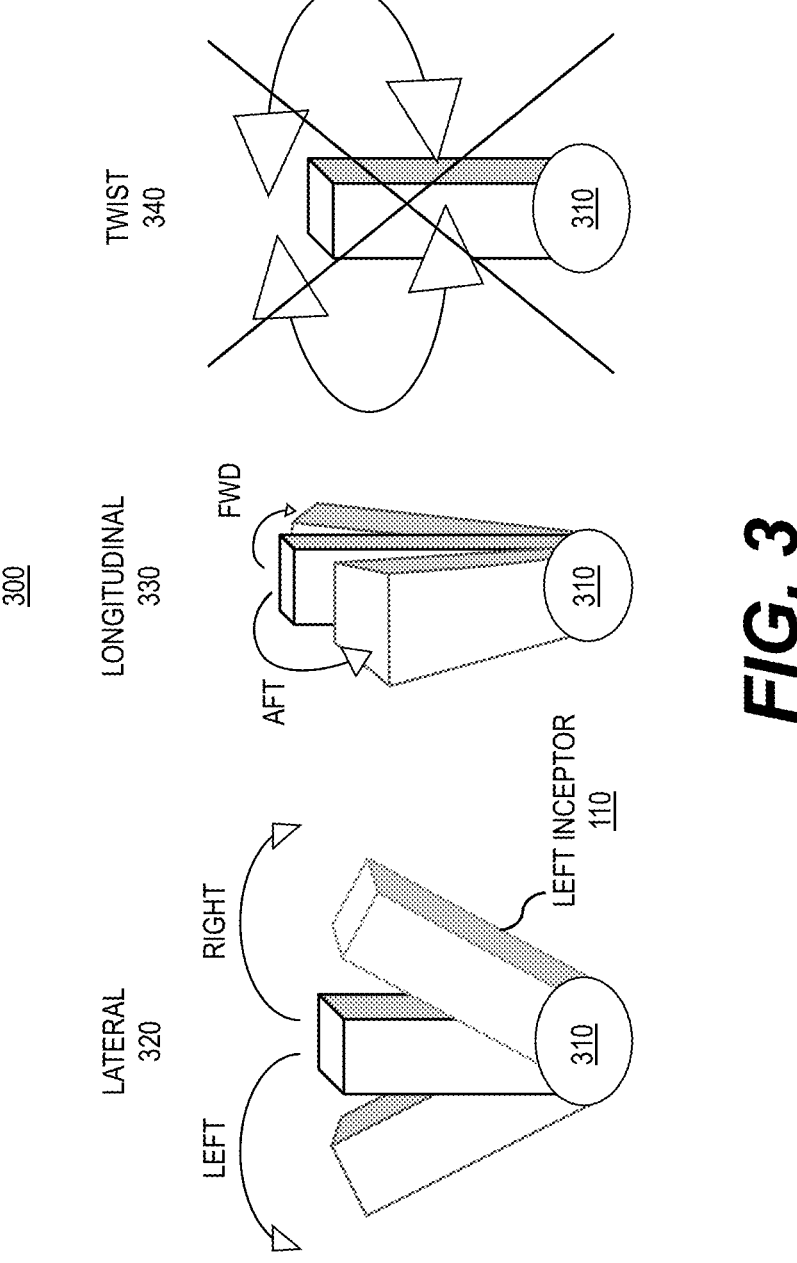
FIG. 3 also illustrates exemplary movements of the inceptors, consistent with disclosed embodiments.

FIG. 3 shows a diagram 300 also illustrating exemplary movements of the inceptors, consistent with disclosed embodiments. As shown in FIG. 3, in some embodiments, each inceptor may be stationed on a base 310 and may be configured for linear movements. For example, each inceptor may be configured for rotations pivoting about a long axis through the inceptor, wherein the inceptor may pivot laterally (320) and/or longitudinally (330). In preferred embodiments, the inceptors may not be configured for rotational movements. For example, the inceptors my not be configured to be twisted (340) about base 310. This ergonomic configuration may improve efficiency for pilots who need to make a significant number of flights in a day. In addition, this inceptor configuration may decrease an error rate associated with piloting, especially in turbulent environments (e.g., wind, rain, vibration), wherein inputs with twisting motion may be less accurate. Although FIG. 3 shows left inceptor 110 as an exemplary inceptor, the same configurations may apply to right inceptor 120.

Figure 4:
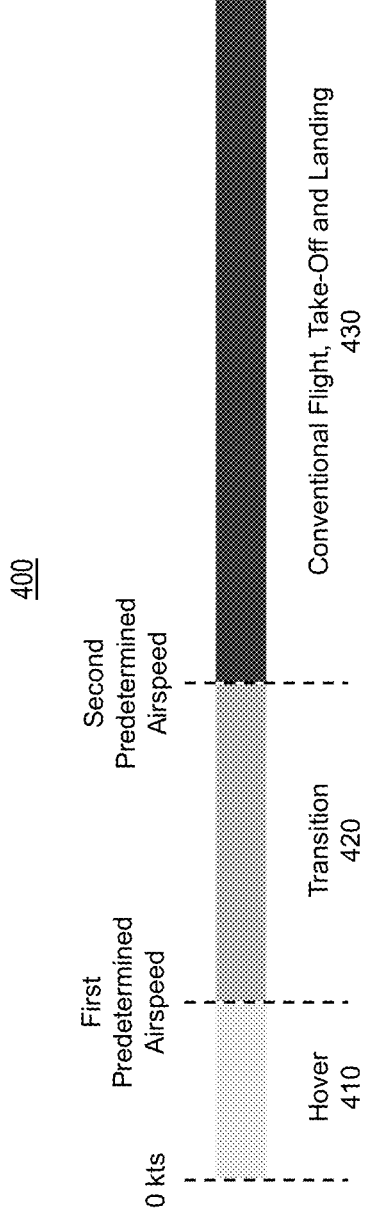
FIG. 4 illustrates exemplary phases of flight, consistent with disclosed embodiments.

FIG. 4 shows a diagram 400 illustrating exemplary airspeeds associated different phases of flight, consistent with disclosed embodiments. In some embodiments, the one or more sensors may communicate with the at least one processor such that the at least one processor may determine a phase of flight of the aircraft based on the measured airspeed of the aircraft. Phases of flight as discussed in the disclosed embodiments may include hover 410, transition 420, and conventional flight, take-off and landing 430. As shown in FIG. 4, the at least one processor may be configured to determine that the aircraft is in hover phase 410 when the measured airspeed of the aircraft is less than a first predetermined airspeed (e.g., 5 kts), transition phase 420 when the measured airspeed of the aircraft is greater than or equal to the first predetermined airspeed and less than a second predetermined airspeed (e.g., 17 kts), and conventional flight, take-off and landing phase 430 when the measured airspeed of the aircraft is greater than or equal to the second predetermined airspeed. Additionally or alternatively, the at least one processor may determine a phase of flight based on an input received via a user interface. For example, the at least one processor may receive a signal indicating the pilot's desire to change the phase of flight, wherein the signal is generated based on the received pilot input (e.g., receiving indication of a button being pushed/moved on an inceptor). Additionally or alternatively, the at least one processor may determine a phase of flight based on a measured groundspeed.

FIG. 5 shows an exemplary table 500 of control mapping associated with the inceptors, consistent with disclosed embodiments. As shown in FIG. 5, in some embodiments, the at least one processor may be configured to use a control law based on the determined phase of flight. Control law as discussed in the disclosed embodiments may refer to a mathematical formula used to determine an output to send to the aircraft. For example, the at least one processor may be configured to use a control law to control the aircraft based on a determined phase of flight such that, when the determined phase of flight is hover 410, a longitudinal linear movement of the first inceptor may provide a corresponding signal to the processor for controlling a longitudinal inertial speed of the aircraft and a lateral linear movement of the first inceptor may provide a corresponding signal to the processor for controlling a lateral inertial speed of the aircraft. Additionally in hover phase 410, a longitudinal linear movement of the second inceptor may provide a corresponding signal to the processor for controlling a vertical speed of the aircraft and a lateral linear movement of the second inceptor may provide a corresponding signal to the processor for controlling a hover turn-rate of the aircraft. On the other hand, when the determined phase of flight is transition 420 or conventional flight, take-off and landing (CTOL) 430, a longitudinal linear movement of the first inceptor may provide a corresponding signal to the processor for controlling an airspeed rate of the aircraft and a lateral linear movement of the first inceptor may provide a corresponding signal to the processor for controlling a lateral air-relative speed of the aircraft. Additionally in transition 420 and CTOL 430, a longitudinal linear movement of the second inceptor may provide a corresponding signal to the processor for controlling a flight path angle rate of the aircraft and a lateral linear movement of the second inceptor may provide a corresponding signal to the processor for controlling a banked turn-rate of the aircraft.

In some embodiments, the at least one processor may be configured to control a heading or altitude of an aircraft using a signal received from an inceptor corresponding to linear movement of the inceptor. For example, the at least one processor may be configured to control the heading of the aircraft using a signal received from the second inceptor corresponding to lateral linear movement of the second inceptor. Additionally or alternatively, the at least one processor may be configured to use a control law to control the heading of the aircraft. Additionally or alternatively, the at least one processor may be configured to control the heading of the aircraft based on a determined phase of flight. For example, when in a vertical takeoff or landing phase of flight, the processor may be configured to control the heading via a yaw axis of the aircraft using the signal received from the second inceptor corresponding to lateral linear movement of the second inceptor. In some embodiments, the processor may be configured to control an altitude of the aircraft using the signal received from the second inceptor corresponding to longitudinal linear movement of the second inceptor. For example, the at least one processor may be configured to control the altitude via a pitch axis of the aircraft using the signal received from the second inceptor corresponding to longitudinal linear movement of the second inceptor.

As further shown in FIG. 5, in some embodiments, the at least one processor may be configured to output response signals to the aircraft's electrical and mechanical components to cause the aircraft to maintain a certain condition in response to either inceptor being returned to detent position. Returning to "detent" position as discussed in the disclosed embodiments may refer to when a inceptor is returned to a neutral position (i.e., 0) along either longitudinal or lateral axis (i.e., 0 ground speed command). For example, when the left inceptor is returned to detent position in the longitudinal axis, the at least one processor may be configured to output response signals to cause the aircraft to either hold its longitudinal position or maintain an airspeed at which the aircraft was moving prior to the left inceptor being returned to detent. In addition, when the left inceptor is returned to detent position in the lateral axis, the at least one processor may output response signals to cause the aircraft to either hold its lateral position or maintain turn-coordination of the aircraft. On the other hand, when the right inceptor is returned to detent position in the longitudinal axis, the at least one processor may output response signals to cause the aircraft to either hold its altitude or maintain a flight path angle at which the aircraft was moving prior to the right inceptor being returned to detent. In addition, when the right inceptor is returned to detent position in the lateral axis, the at least one processor may output response signals to cause the aircraft to hold its heading. In order to implement these responses to either inceptor being returned to detent position, signals may be sent to the aircraft's electrical and mechanical components to make changes such as adjusting propeller tilt, propeller speed, roll angle, rudder deflection, compensating roll, and others.

In some embodiments, the at least one processor may be configured to output certain response signals based on the determined phase of flight. For example, when the left inceptor is returned to detent in the longitudinal axis while the aircraft is in the hover phase, the at least one processor may output response signals to cause the aircraft holds its longitudinal position. On the other hand, when the left inceptor is returned to detent in the longitudinal axis while the aircraft is in the transition or CTOL phase, the at least one processor may output response signals to cause the aircraft to maintain an airspeed at which the aircraft was moving prior to the left inceptor being returned to detent. In another example, when the left inceptor is returned to detent in the lateral axis while the aircraft is in the hover phase, the at least one processor may output response signals to adjust a roll angle to cause the aircraft to hold its lateral position. On the other hand, when the left inceptor is returned to detent in the lateral axis while the aircraft is in the transition or CTOL phase, the at least one processor may output response signals to cause the aircraft to maintain turn-coordination of the aircraft. Turn-coordination as discussed in the disclosed embodiments may refer to causing the aircraft to remain in a coordinated turn without lateral acceleration. Doing so may allow the pilot and passengers of the aircraft to feel no lateral g forces until the left inceptor is moved out of detent to command a non-zero lateral speed, in which case the turn may no longer be coordinated. In another example, when the right inceptor is returned to detent in the longitudinal axis while the aircraft is in the hover phase, the at least one processor may output response signals to cause the aircraft to hold its altitude. On the other hand, when the right inceptor is returned to detent in the longitudinal axis while the aircraft is in the transition or CTOL phase, the at least one processor may output response signals to cause the aircraft to maintain a flight path angle of the aircraft. Maintaining the flight path angle of the aircraft as discussed in the disclosed embodiments may refer to the inceptor commanding a constant reference flight path angle such that, when the aircraft is disturbed, the control law causes feedback to return the aircraft to the commanded flight path angle. In some embodiments, when the right inceptor is moved out of detent in the lateral axis, the corresponding command may be a non-zero roll angle (i.e., non-zero turn-rate) and when the right inceptor is returned to detent in the lateral axis, the corresponding command may be a nearly 0 roll (i.e., heading hold), no matter the determined phase of flight. Additionally or alternatively, in certain phases of flight (e.g., CTOL), when the right inceptor is moved out of detent in the lateral axis, the corresponding command may be a non-zero roll-rate and, when the right inceptor is returned to detent in the lateral axis, the corresponding command may be to maintain a constant roll angle.

Disclosed embodiments of the inceptors may be configured to allow each inceptor to be in detent position in one axis and not the other. For example, the left inceptor may be in detent position along the longitudinal axis but at the same time moved laterally to command a lateral movement. In addition, disclosed embodiments of the inceptors may be configured to allow for being in detent position in both the longitudinal and lateral axes. For example, when the left inceptor is returned to detent in both the longitudinal and lateral axes while in the hover phase, the at least one processor may output response signals to cause the aircraft to hold both its longitudinal and lateral position.

In some embodiments, the flight control apparatus may include a response mode change button. The response mode change button may be located on one of the inceptors (e.g., the left inceptor) and, once pressed, may change the response mode from a translational rate command response type and position hold (TRC+PH) to acceleration/attitude command and speed/velocity hold (ACSH/ACVH) such that there is a different response when the left inceptor is returned to detent in the longitudinal axis. In TRC+PH mode, the aircraft may respond to the left inceptor being returned to detent along the longitudinal axis by holding a longitudinal position of the aircraft. Once a pilot presses on the response mode change button to change the response mode to ACSH/ ACVH mode, the aircraft may respond to the left inceptor being returned to detent along the longitudinal axis by maintaining an airspeed at which the aircraft was moving prior to the left inceptor being returned to detent along the longitudinal axis. In some embodiments, the response mode change button may only be available for use when the aircraft is moving at a ground speed less than a predetermined threshold (e.g., less than 17 kts). For example, the at least one processor may ignore any received request to change the response mode when the request is received (e.g., due to the response mode change button being pressed) while the aircraft is moving at a ground speed greater than the predetermined threshold. In some embodiments, each time a response mode change occurs, the current response mode may be announced to the pilot. For example, the at least one processor may cause the current response mode to be displayed in text via a visual indication (e.g., Flight Mode Annunciation system) in front of the pilot.

In some embodiments, the flight control apparatus may include a transition button configured to configure the aircraft in transition mode for outbound and inbound transitions. For example, the transition button may be located only on one of the inceptors (e.g., left inceptor), and when the transition button is moved up/forward (FWD), the at least one processor may send signals to the aircraft's electrical and mechanical components to prepare the aircraft for outbound transition mode, including beginning a scheduled optimal airspeed transition to get to a designed cruise speed.

In some embodiments, the scheduled optimal airspeed may be a predetermined optimal airspeed. "Optimal" as discussed in the disclosed embodiments may refer to predetermined data stored in a lookup table to address certain scenarios. For example, a first scenario in which an aircraft is pursuing a particularly aggressive climb may have a different associated optimal airspeed than a second scenario in which an aircraft is pursuing a gentle climb. In some embodiments, the outbound transition function may be available once the aircraft is a certain distance from above the ground. For example, the outbound transition function may not be available when the aircraft is still on the ground. In some embodiments, once the outbound transition function is initiated, only the left inceptor may function to increase or decrease a speed of the transition without canceling the outbound transition function. In some embodiments, the outbound transition function may be cancelled by moving the transition button down/aft (AFT).

In some embodiments, when the transition button is moved down/aft, the aircraft may be placed in inbound transition mode which may begin an optimal deceleration profile and cause the aircraft to come to a stabilized hover at a given location. For example, the flight control apparatus may include a map configured to display a landing point to the pilot. In some embodiments, the inceptors may be configured to accept inputs to change the landing point displayed on the map. For example, if a pilot determines that the displayed landing point is not ideal, movement of the inceptors forward or aft may push the landing point of the aircraft out or in, respectively. In some embodiments, the flight control apparatus may include a global positioning system (GPS) unit for accurate geopositioning. Additionally or alternatively, the at least one processor may determine a landing point based on wind speeds. For example, the at least one processor may communicate with one or more sensors to measure position as a feedback signal as the aircraft slows down such that the aircraft comes to a stop at the indicated landing point. Doing so may continually adjust for uncertain wind as the aircraft slows down, and the flight control system control laws may configure the flight control system to perform this automatically without pilot input after a transition has been initiated. In some embodiments, the flight control apparatus may use location information relative to a landing site to determine a landing point. For example, the flight control apparatus may store one or more previously identified landing sites (e.g., through flight planning, selection through a display, etc.) such that activating the inbound transition mode may bring the aircraft to a hover at one of the one or more previously identified landing sites. The transition modes may function to reduce pilot workload and may alleviate stick forces while allowing the aircraft to follow a designed optimal transition profile.

Figure 6:
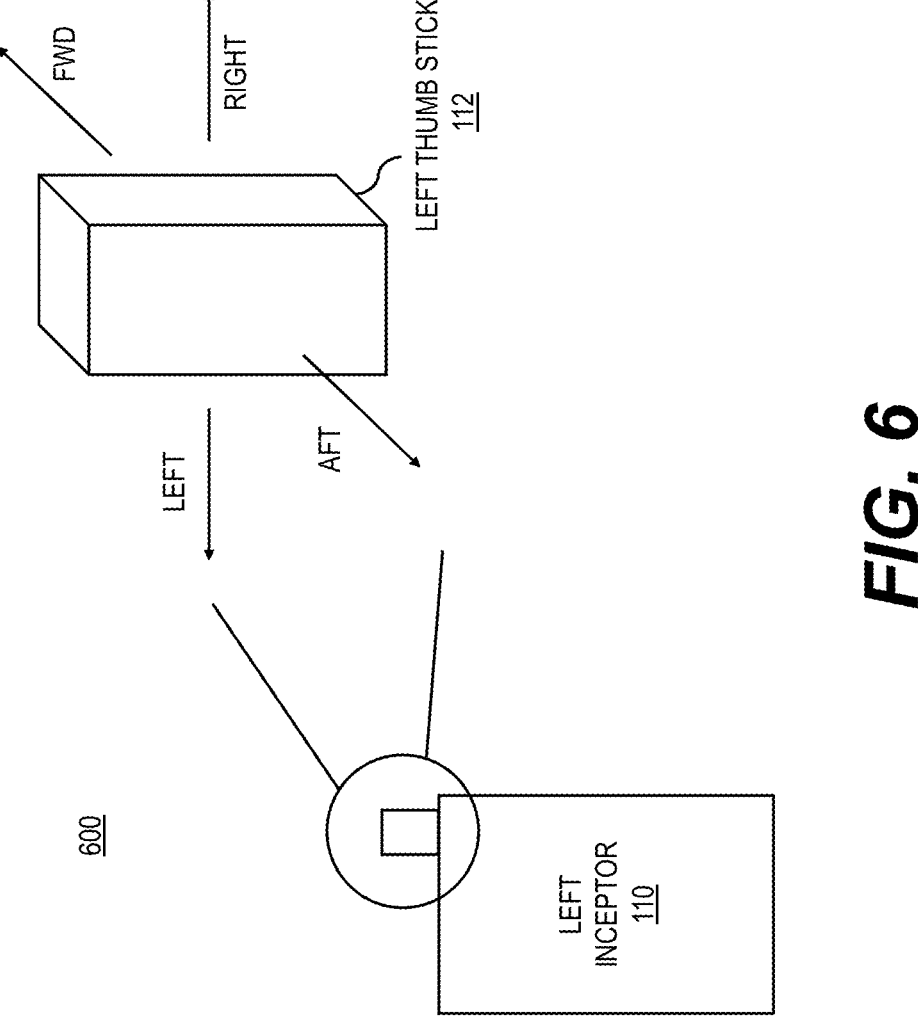
FIG. 6 illustrates exemplary movements of the thumb sticks, consistent with disclosed embodiments.

FIG. 6 shows a diagram 600 illustrating exemplary movements of the inceptors, consistent with disclosed embodiments. In some embodiments, each thumb stick may be configured to function as a replacement for its associated inceptor. For example, as shown in FIG. 6, left thumb stick 112 may be configured to pivot longitudinally (i.e., up/forward and down/aft) and/or laterally (i.e., right and left) on a base, wherein each longitudinal and lateral movement and resulting inceptor position may be interpreted as a digital value to be input into the at least one processor and output as signals to various electrical and mechanical components of the aircraft. In some embodiments, the flight control apparatus may include a inceptor disable button per inceptor in order to change control from the inceptor to its respective thumb stick. For example, upon detection of failure of a inceptor (e.g., aircraft is nonresponsive to inceptor movements, inceptor is jammed, etc.), pressing the disable button may allow for control to be switched to the thumb stick such that the thumb stick replaces the failed inceptor. In some embodiments, control may be switched from a inceptor to its corresponding thumb stick on one side while control on the other side remains in the inceptor. For example, pressing the left inceptor disable button may switch control from the left inceptor to the left thumb stick, but the right inceptor is unaffected such that control remains in the right inceptor. In some embodiments, prior to receiving a request to disable a inceptor (e.g., by pressing a inceptor disable button), the respective thumb stick may be in an inactive state. In other embodiments, each thumb stick may have a separate function prior to the system receiving a request to switch control from a inceptor to its respective thumb stick. Although FIG. 6 shows left inceptor 110 and thumb stick 112 as examples, the same configurations may apply to right inceptor 120 and thumb stick 122.

Figure 7:
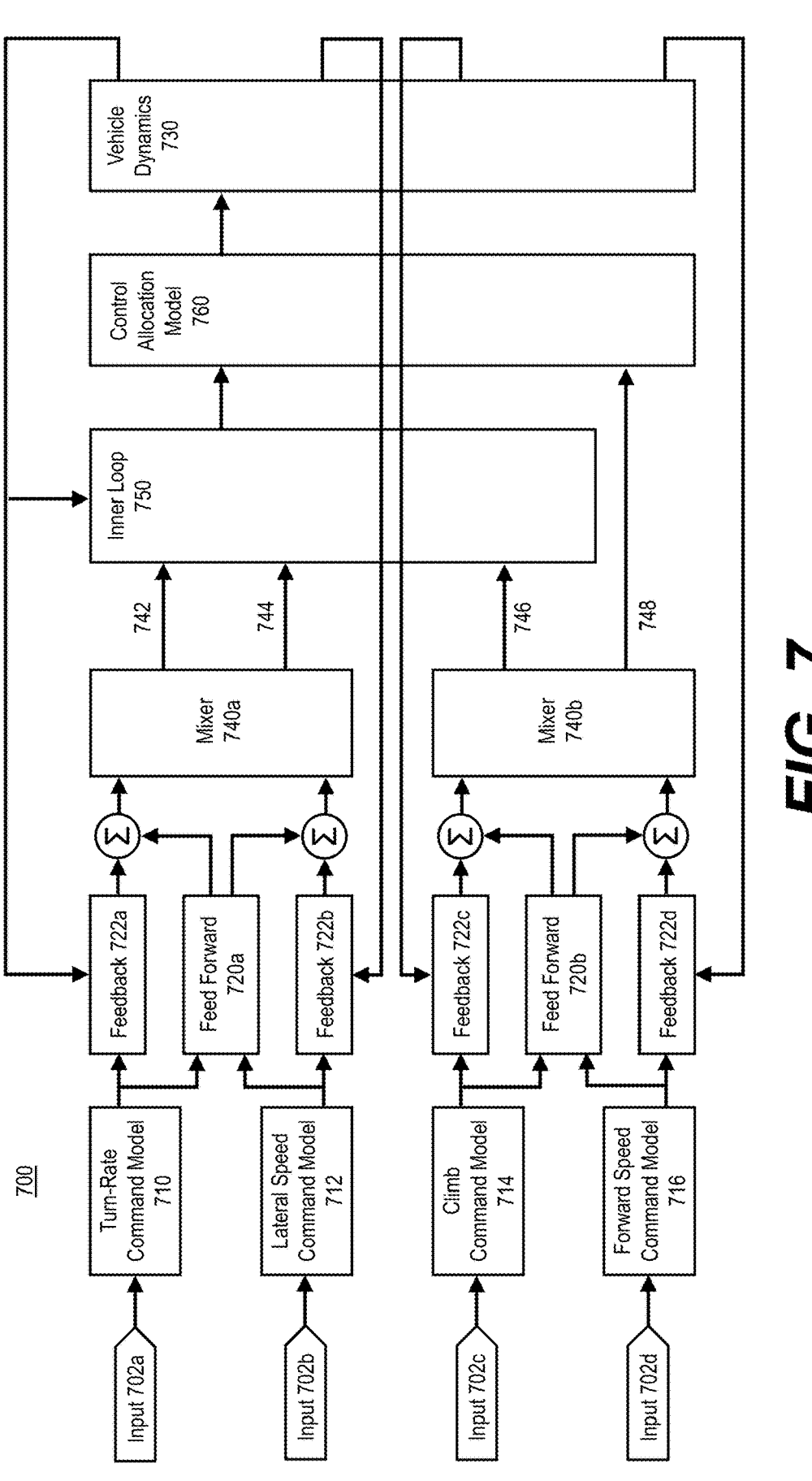
FIG. 7 shows a block diagram of an exemplary flight control system, consistent with disclosed embodiments.

FIG. 7 is a functional block diagram of an exemplary control system 700 of an electric VTOL aircraft, consistent with disclosed embodiments. System 700 may be implemented by a microprocessor-based controller executing software code stored in a storage medium to implement the functions described herein. System 700 may also be implemented in hardware, or a combination of hardware and software. System 700 may be implemented as part of a flight control system of the aircraft and may be configured to perform a single step or sequence repeatedly until a desired or commanded outcome is achieved. It is to be understood that many of conventional functions of the control system are not shown in FIG. 7 for ease of description.

System 700 may detect one or more inputs 702a, 702b, 702c and 702d, which may include at least one of a position and/or rate of a right inceptor and/or a left inceptor, signals received from switches on the inceptors (e.g., response type change commands, trim inputs, backup control inputs, etc.), measurements of aircraft state and environmental conditions based on data received from one or more sensors of the aircraft (e.g., measured load factor, airspeed, bank angle, pitch angle, actuator states, battery states, aerodynamic parameters, temperature, gusts, etc.), obstacles (e.g., presence or absence of other aircraft and/or debris), and an aircraft mode (e.g., taxiing on the ground, takeoff, in-air). For example, input 702a may include a lateral position and/or rate of the right inceptor, input 702b may include a lateral position and/or rate of the left inceptor, input 702c may include a longitudinal position and/or rate of the right inceptor, input 702d may include a longitudinal position and/or rate of the left inceptor, and each input may include additional data as listed above (e.g., signals from switches, measurements of aircraft state, aircraft mode, etc.). Actuator states may include actuator hardware limits, such as travel limits, speed limits, response time limits, etc., and can include actuator health indicators that may indicate deteriorations in actuator performance that may limit a given actuator's ability to satisfy actuator commands. Actuator states may be used to determine the bounds (e.g., minimum/maximum values) for individual actuator commands. Battery states may be the remaining energy of the battery packs of the aircraft, which may be monitored when control allocation model 760 considers balancing battery pack energy states. Aerodynamic parameters may be parameters derived from aerodynamic and acoustic modeling and can be based on the actuator Jacobian matrices and actuator states. Each input received from an inceptor may indicate a pilot's desire to adjust an aircraft's heading or power output.

Command models 710, 712, 714 and 716 may be configured to determine a shape (e.g., aggressiveness, slew rate, damping, overshoot, etc.) of an ideal aircraft response. For example, each command model of command models 710, 712, 714 and 716 may be configured to receive and interpret at least one of inputs 702a, 702b, 702c and 702d and, in response, compute a corresponding desired change to an aircraft's orientation, heading, and propulsion, or a combination thereof using an integrator (not pictured). In some embodiments, input 702a may be fed into turn-rate command model 710, input 702b may be fed into lateral speed command model 712, input 702c may be fed into climb command model 714, and input 702d may be fed into forward speed command model 716. Turn-rate command model 710 may be configured to output a desired position and/or turn-rate command, and may also be configured to compute a desired heading of the aircraft to be assumed when the inceptor is brought back to a centered position (i.e., in detent). Lateral speed command model 712 may be configured to output a desired position and/or lateral speed command. Climb command model 714 may be configured to output a desired altitude and/or vertical speed command. Forward speed command model 716 may be configured to output a desired position and/or longitudinal speed command. In some embodiments, one or more of the command models may be configured to output an acceleration generated in response to changes in speed command. For example, climb command model 714 may be configured to output a vertical acceleration generated in response to a change in vertical speed command.

Feed forward 720a and 720b may each receive as input the desired changes (e.g., desired position, speed and/or acceleration) from corresponding command models 710, 712, 714 and/or 716 as well as data received from the one or more aircraft sensors (e.g., airspeed, vehicle orientation, vehicle load factor, measured acceleration, vehicle mass and inertia, air density, altitude, aircraft mode, etc.) and may be configured to output, for each desired change, a corresponding force required to accomplish the desired change. In some embodiments, feed forward 720a and 720b may be configured to determine the corresponding force using simplified models of aircraft dynamics. For example, based on a known or determined mass of the aircraft, feed forward 720a and 720b may be configured to determine a force required to follow a desired acceleration command. In some embodiments, feed forward 720a and 720b may be configured to use a model predicting an amount of drag on the vehicle produced as a function of speed in order to determine a force required to follow a desired speed command signal.

Feedback 722a, 722b, 722c and 722d may each receive as input the desired changes (e.g., desired position, speed and/or acceleration) from command models 710, 712, 714 and 716 as well as data received from vehicle dynamics 730. For example, vehicle dynamics 730 may comprise the physics and/or natural dynamics of the aircraft, including sensor measurements of how the aircraft moves in response to pilot inputs, propulsion system outputs, ambient conditions, etc. Additionally or alternatively, vehicle dynamics 730 may include error signals generated by one or more processors based on exogenous disturbances (e.g., gust causing speed disturbance). In some embodiments, feedback 722a, 722b, 722c and 722d may be configured to generate feedback forces based on the received error signals. For example, feedback 722a, 722b, 722c and 722d may generate feedback forces with the intent of counteracting the effect(s) of external disturbances. Additionally or alternatively, feedback 722a, 722b, 722c and 722d may be configured to generate feedback forces based on modeling errors. For example, if an incorrect aircraft mass is input into either feed forward 720a or 720b, the aircraft may accelerate faster or slower than the desired change. Based on determining a difference between the desired acceleration and the measured acceleration, one or more processors may generate an error signal (e.g., included in vehicle dynamics 730) which may be looped into feedback 722a, 722b, 722c, and/or 722d to determine an additional force needed to correct the error.

In some embodiments, feedback 722a, 722b, 722c, and 722d may be disabled. For example, in response to losing position and/or ground speed feedback due to disruption of global position system (GPS) communication, system 700 may be configured to operate without feedback 722a, 722b, 722c and 722d until GPS communication is reconnected.

In some embodiments, feedback 722a, 722b, 722c and 722d may receive as input a plurality of measurements as well as a trust value for each measurement indicating whether the measurement is valid. For example, one or more processors of system 700 may assign a Boolean (true/false) value for each measurement in control law to indicate that the measurement is trustworthy (e.g., yes) or that the measurement may be invalid (e.g., no). Based on one or more processors identifying a measurement as invalid, feedback 722a, 722b, 722c, and/or 722d may omit that measurement for further processing. For example, based on one or more processors identifying a heading measurement as invalid, feedback 722a, 722b, 722c and/or 722d may omit subsequent heading measurements in determining feedback force(s).

In some embodiments, feedback 722a, 722b, 722c, 722d may determine one or more feedback forces based on actuator state information received from one or more sensors (e.g., included in vehicle dynamics 730). For example, based on actuator state information indicating that there is a failure of an actuator, one or more processors of system 700 may update control law and determine an alternative command to achieve the desired change. Additionally or alternatively, based on actuator state information indicating that one or more actuators are at a maximum value, one or more processors of system 700 may update control law and determine an alternative command to achieve the desired change.

Total desired forces may be calculated based on outputs of feedback 722a, 722b, 722c, 722d and feed forward 720a and 720b. For example, one or more processors of system 700 may calculate a desired turn-rate force by summing the outputs of feedback 722a and feed forward 720a. Additionally or alternatively, one or more processors of system 700 may calculate a desired lateral force by summing the outputs of feedback 722b and feed forward 720a. Additionally or alternatively, one or more processors of system 700 may calculate a desired vertical force by summing the outputs of feedback 722c and feed forward 720b. Additionally or alternatively, one or more processors of system 700 may calculate a desired longitudinal force by summing the outputs of feedback 722d and feed forward 720b.

Mixers 740a and 740b may each be configured to receive as input one or more desired forces and data received from the one or more aircraft sensors (e.g., airspeed, vehicle orientation, vehicle load factor, measured acceleration, vehicle mass and inertia, indications of working/failed actuators, air density, altitude, aircraft mode, whether the aircraft is in the air, etc.). Based on the inputs, mixers 740a and 740b may be configured to command bank 742, command yaw 744, command pitch 746, demand thrust 748, or output a combination of different commands/demands in order to achieve the one or more desired forces.

Mixer 740a may receive as input a desired turn-rate force and/or a desired lateral force and may command bank 742 and/or command yaw 744. In some embodiments, mixer 740a may determine output based on a determined flight mode. For example, in a hover flight mode, mixer 740a may achieve the desired lateral force by focusing on bank command 742 and may achieve the desired turn-rate force by focusing on yaw command 744. In a forward-flight mode, mixer 740a may achieve the desired lateral force by focusing on yaw command 744 and may achieve the desired turn-rate force by focusing on bank command 742. In a transition between hover flight mode and forward flight mode, mixer 740a may achieve desired forces using a combination of bank command 742 and yaw command 744.

Mixer 740b may receive as input a desired vertical force and/or a desired longitudinal force and may output pitch command 746 (i.e., pitch angle) and thrust demand 748. Thrust demand 748 may include longitudinal thrust (i.e., mix of nacelle tilt and front propeller thrust) and vertical thrust (i.e., combined front and rear thrust). In some embodiments, mixer 740b may determine output based on a determined flight mode. For example, in a hover flight mode, mixer 740b may achieve a desired longitudinal force by lowering a pitch attitude and by using longitudinal thrust, and may achieve a desired vertical force by focusing on vertical thrust. In a forward-flight mode, mixer 740b may achieve a desired longitudinal force by focusing on longitudinal thrust (e.g., front propeller thrust). In a cruise flight mode, mixer 740b may achieve a desired vertical force by commanding pitch 746 (e.g., raising pitch attitude) and demanding thrust 748 (e.g., increasing longitudinal thrust).

In some embodiments, mixers 740a and 740b may be configured to output force and moment commands to inner loop 750. Force and moment commands may include up to six force and moment commands, which can include x, y, and z force commands and x, y, and z moment commands. As is known in the art, the force and moment commands can be derived from operator commands (or autopilot commands, or commands from an autonomous controller for un-piloted aircraft) and the aircraft states (e.g., speed, acceleration, altitude, attitude).

Inner loop 750 may be configured to determine the mechanical and electrical movements necessary to implement the received force and moment commands. In some embodiments, inner loop 750 may be dependent on vehicle dynamics 730. For example, inner loop 750 may be configured to compensate for disturbances at the attitude and rate level in order to stabilize the aircraft. Additionally or alternatively, inner loop 750 may consider periods of natural modes (e.g., phugoid modes) that affect the pitch axis, and may control the aircraft appropriately to compensate for such natural modes of the vehicle. In some embodiments, inner loop 750 may be dependent on vehicle inertia.

Control allocation model 760 may accept as inputs one or more of: force and moment commands, data received from the one or more aircraft sensors, envelope protection limits, scheduling parameter, and optimizer parameters. Based on the inputs, control allocation model 760 may be configured to determine actuator commands by minimizing an objective function that includes one or more primary objectives, such as meeting commanded aircraft forces and moments, and one or more secondary objectives, which can include minimizing acoustic noise and/or optimizing battery pack usage.

The envelope protection limits can include command limits that prevent operation outside of the flight envelope, which defines the operational limits for the aircraft, including speed and acceleration-based limits, as is known in the art.

The scheduling parameter may be a speed-related parameter that is used for defining the allocation problem.

The aerodynamic parameters, as discussed above, may be functions of the scheduling parameter.

The optimizer parameters may be parameters used to define the optimization problem, as discussed further below. The optimizer parameters can include axis weights that define relative prioritization of force and moment axes. The optimizer parameters can also include individual actuator weights that define the relative importance of different actuators in the control allocation problem. In some embodiments, the optimizer parameters may be functions of the scheduling parameter.

In some embodiments, control allocation model 760 may be configured to compute the limits of individual actuator commands based on the actuator states and envelope protection limits. In normal operation, the minimum command limit for a given actuator includes the maximum of: the minimum hardware based limit and the minimum flight envelope limit; and the maximum command limit for a given actuator includes the minimum of: the maximum hardware based limit and the maximum flight envelope limit. In the case of an actuator failure, the command limits for the failed actuator correspond to the failure mode.

Figure 8:
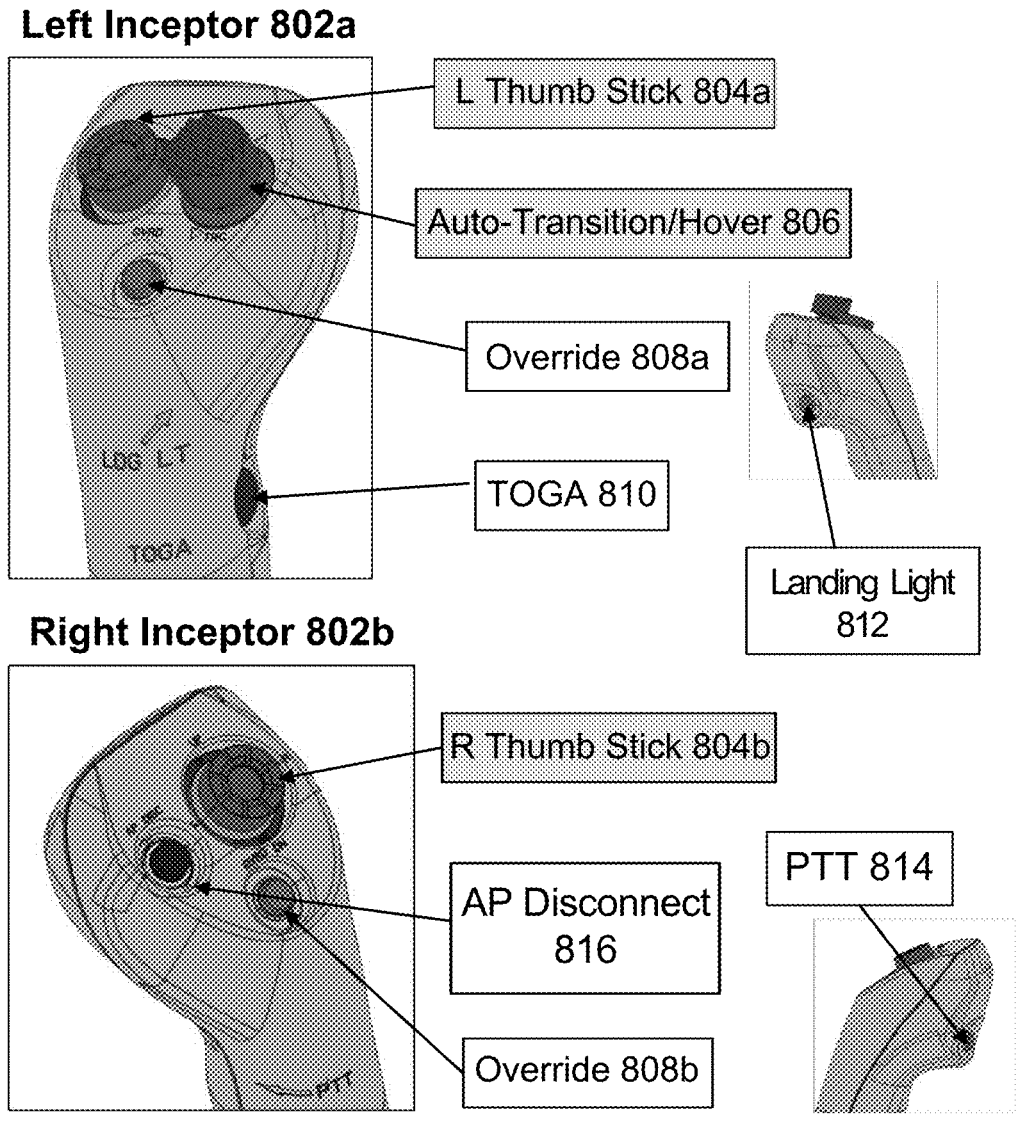
FIG. 8 illustrates exemplary inceptors, consistent with disclosed embodiments.

FIG. 8 illustrates exemplary inceptors, consistent with disclosed embodiments. For example, left inceptor 802a may be an inceptor located on a left-hand side of a pilot and right inceptor 802b may be an inceptor located on a right-hand side of the pilot. Left inceptor 802a may include thumb stick 804a, auto-transition/hover switch 806, override button 808a, takeoff/go-around (TOGA) switch 810, and landing light button 812. Right inceptor 802b may include thumb stick 804b, override 808b, push-to-talk (PTT) button 814, and auto-pilot (AP) disconnect button 816.

Thumb stick 804a may be configured to perform different functions based on a determined operating mode. For example, during a normal operating mode (e.g., override inceptor has not been enabled), thumb stick 804a may be configured to act as a beep switch that can adjust airspeed by 1 knot per beep (e.g., a single beep up of thumb stick 804a commands an airspeed increase by 1 knot). On the other hand, during override mode (e.g., override inceptor has been enabled), control may be transferred from left inceptor 802a to thumb stick 804a such that linear deflection of left inceptor 802a may be ignored by the flight control system. The same configurations may apply to thumb stick 804b of right inceptor 802b.

Auto-transition/hover switch 806 may be configured for forward movement, aft movement, and may also be moved/pushed in. For example, moving switch 806 up/forward may place the aircraft in an outbound auto-transition mode. On the other hand, moving switch 806 back/aft may place the aircraft in an inbound auto-transition mode. Depressing switch 806 (i.e. pushing the switch in) may place the aircraft in a hover response mode. In some embodiments, depressing switch 806 may toggle the aircraft between a hover response mode and a forward-flight mode. In some embodiments, based on determining that the aircraft is moving at an airspeed above predetermined threshold, the flight control system may ignore depression of switch 806.

Override button 808a may be configured to transfer control from left inceptor 802a to thumb stick 804a such that linear deflection of left inceptor 802a may be ignored. The same configurations may apply to override button 808b.

TOGA switch 810 may be configured to perform different autopilot functions based on a determined phase of flight. For example, based on the phase of flight being a takeoff phase, depressing switch 810 may cause the aircraft to increase engine speeds to provide a computed takeoff power. On the other hand, based on the phase of flight being a landing phase, depressing switch 810 may cause the aircraft to "go around" by increasing a power to go-around thrust.

Landing light button 812 may be configured to turn on/off a light used to help with landing. PTT button 814 may be configured to enable push-to-talk pilot input. AP disconnect button 816 may be configured to disable autopilot.

Additionally or alternatively, the buttons and switches may be configured for a single press such that they do not need to be held down in order to perform their respective functions.

FIG. 9 shows an exemplary method 900 for controlling an aircraft, consistent with disclosed embodiments. Method 900 can be used for controlling an electric aircraft with a flight control apparatus, such as flight control apparatus of FIG. 1. As discussed above, method 900 or a portion thereof may be performed by processor 130.

In step 902, processor 130 may be configured to receive signals corresponding to longitudinal and lateral linear movements of a first inceptor and a second inceptor, wherein the first inceptor and the second inceptor are configured to accept longitudinal and lateral linear movements as manual input. As discussed in FIG. 1 above, each inceptor may have one or more sensors integrated onto the inceptor configured to respond to a force applied via movement of the inceptor by generating and transmitting electronic signals corresponding to movement of the inceptor to processor 130. Additionally or alternatively, each inceptor may have one or more sensors integrated onto the inceptor configured to respond to a force applied via movement of the inceptor by generating and transmitting electronic signals corresponding to movement of the inceptor to processor 130. Additionally or alternatively, each inceptor may comprise a force-feedback component configured to receive control signals from a flight control computer of the flight control apparatus and to apply counter forces based on the received control signals.

In some embodiments, processor 130 may determine an airspeed of the aircraft, and may determine a phase of flight of a plurality of phases of flight based on the determined airspeed of the aircraft. For example, processor 130 may be configured to communicate with one or more sensors configured to measure an airspeed of the aircraft. Based on the measured airspeed, processor 130 may determine a phase of flight of the aircraft. Additionally or alternatively, processor 130 may determine a phase of flight based on an input received via a user interface. For example, processor 130 may receive a signal indicating the pilot's desire to change the phase of flight, wherein the signal is generated based on the received pilot input (e.g., receiving indication of a button being pushed/moved on an inceptor). Additionally or alternatively, processor 130 may determine a phase of flight based on a measured groundspeed.

In some embodiments, the plurality of phases of flight include hover, transition and conventional take-off and landing (CTOL). For example, processor 130 determines the phase of flight to be hover when the measured airspeed is less than a first predetermined airspeed, transition when the measured airspeed is greater than or equal to the first predetermined airspeed and less than a second predetermined airspeed, and conventional take-off and landing (CTOL) when the measured airspeed is greater than or equal to the second predetermined airspeed.

In step 904, processor 130 may be configured to control movement of an aircraft based on the received signals, wherein controlling a heading of the aircraft is based on a signal corresponding to lateral linear movement of the second inceptor. In some embodiments, controlling the heading of the aircraft may comprise using a control law. In some embodiments, controlling heading of the aircraft may be further based on a determined phase of flight. For example, when in a vertical takeoff or landing phase of flight, controlling the heading via a yaw axis of the aircraft may be based on a signal corresponding to lateral linear movement of the second inceptor. In some embodiments, processor 130 may be configured to receive a movement signal from the second inceptor, wherein the movement signal corresponds to a longitudinal linear movement of the second inceptor, and may control an altitude of the aircraft based on the received movement signal.

In some embodiments, controlling movement of the aircraft based on the received signals may further comprise using a control law based on a determined phase of flight. For example, when the determined phase of flight is hover, controlling a longitudinal inertial speed may be based on received signals corresponding to longitudinal linear movements of the first inceptor and controlling a lateral inertial speed may be based on received signals corresponding to lateral linear movements of the first inceptor. Additionally or alternatively, when the determined phase of flight is hover, controlling a vertical speed may be based on received signals corresponding to longitudinal linear movements of the second inceptor and controlling a hover turn-rate is based on received signals corresponding to lateral linear movements of the second inceptor. In some embodiments, when the determined phase of flight is transition or conventional take-off and landing (CTOL), controlling an airspeed rate may be based on received signals corresponding to longitudinal linear movements of the first inceptor and controlling a lateral air-relative speed may be based on received signals corresponding to lateral linear movements of the first inceptor. Additionally or alternatively, controlling a flight path angle rate may be based on received signals corresponding to longitudinal linear movements of the second inceptor and controlling a banked turn-rate may be based on received signals corresponding to lateral linear movements of the second inceptor.

In some embodiments, processor 130 may receive a mode signal to switch flight control. For example, processor 130 may receive a model signal to switch flight control from a first mode to a second mode, and may switch flight control from the first mode to the second mode, wherein the first mode is a hover mode and the second mode is a cruise mode. In some embodiments, processor 130 may receive a mode signal to switch flight control from a first mode to a third mode, and may switch flight control from the first mode to the second mode, wherein the first mode is a hover mode and the third mode is a deceleration mode.

In some embodiments, processor 130 may receive a transfer control signal, and, in response to the received transfer control signal, may transfer command control from at least one of the first inceptor or the second inceptor to at least one of a third inceptor or a fourth inceptor. For example, in response to receiving a transfer control signal from the first inceptor (e.g., left inceptor), processor 130 may transfer command control to the third inceptor (e.g., left thumb stick).

In some embodiments, the second inceptor is not configured to accept a twisting movement as manual input.

In some embodiments, controlling the heading of the aircraft is not based on a signal corresponding to a twisting movement of the second inceptor.

The embodiments may further be described using the following clauses:

Clause Set A:

1. A flight control apparatus comprising:
   a processor;
   a first inceptor, communicatively coupled to the processor, the first inceptor configured to accept longitudinal and lateral linear movements as manual input and provide corresponding signals to the processor; and
   a second inceptor, communicatively coupled to the processor, the second inceptor configured to accept longitudinal and lateral linear movements as manual input and provide corresponding signals to the processor;
   wherein the processor is configured to control a heading of an aircraft using a signal received from the second inceptor corresponding to lateral linear movement of the second inceptor.

2. The apparatus of claim A1, wherein the processor is configured to use a control law to control the heading of the aircraft.

3. The apparatus of claim A1, wherein the processor is configured to control the heading of the aircraft based on a determined phase of flight.

4. The apparatus of claim A3, wherein in a vertical takeoff or landing phase of flight, the processor is configured to control the heading via a yaw axis of the aircraft using the signal received from the second inceptor corresponding to lateral linear movement of the second inceptor.

5. The apparatus of claim A1, wherein the processor is configured to control an altitude of the aircraft using the signal received from the second inceptor corresponding to longitudinal linear movement of the second inceptor.

6. The apparatus of claim A5, wherein the first inceptor is a left inceptor and the second inceptor is a right inceptor relative to a pilot of the aircraft.

7. The apparatus of claim A1, wherein the second inceptor is not configured to accept a twisting movement as manual input.

8. The apparatus of claim A1, wherein the second inceptor is not configured to provide a signal to the processor corresponding to a twisting movement as manual input.

9. The apparatus of claim A1, wherein the processor is not configured to control the heading of the aircraft using a signal received from the second inceptor corresponding to a twisting movement of the second inceptor.

10. The apparatus of claim A1, wherein the flight control apparatus does not include foot pedals configured to control the heading via a yaw axis of the aircraft in flight.

11. The apparatus of claim A3, further comprising:
    at least one sensor configured to measure an airspeed of the aircraft, wherein the at least one sensor is communicatively coupled to the at least one processor to determine the phase of flight of a plurality of phases of flight based on the measured airspeed of the aircraft, and
    wherein the plurality of phases of flight include hover when the measured airspeed is less than a first predetermined airspeed, transition when the measured airspeed is greater than or equal to the first predetermined airspeed and less than a second predetermined airspeed, and conventional take-off and landing (CTOL) when the measured airspeed is greater than or equal to the second predetermined airspeed.

12. The apparatus of claim A1, wherein the processor is further configured to use a control law to control the aircraft based on a determined phase of flight such that: when the determined phase of flight is hover, a longitudinal linear movement of the first inceptor provides a corresponding signal to the processor for controlling a longitudinal inertial speed of the aircraft and a lateral linear movement of the first inceptor provides a corresponding signal to the processor for controlling a lateral inertial speed of the aircraft, and a longitudinal linear movement of the second inceptor provides a corresponding signal to the processor for controlling a vertical speed of the aircraft and a lateral linear movement of the second inceptor provides a corresponding signal to the processor for controlling a hover turn-rate of the aircraft; and when the determined phase of flight is transition or conventional take-off and landing (CTOL), a longitudinal linear movement of the first inceptor provides a corresponding signal to the processor for controlling an airspeed rate of the aircraft and a lateral linear movement of the first inceptor provides a corresponding signal to the processor for controlling a lateral air-relative speed of the aircraft, and a longitudinal linear movement of the second inceptor provides a corresponding signal to the processor for controlling a flight path angle rate of the aircraft and a lateral linear movement of the second inceptor provides a corresponding signal to the processor for controlling a banked turn-rate of the aircraft.

13. The apparatus of claim A1, wherein the at least one processor is configured to determine a response mode and output an inceptor command based on the determined response mode, including:

when the determined response mode is a first mode and the first inceptor is placed in detent longitudinally, the output inceptor command is to hold a current longitudinal position of the aircraft; and when the determined response mode is a second mode and the first inceptor is placed in detent longitudinally, the output inceptor command is to maintain an airspeed at which the aircraft was moving prior to placing the first inceptor in longitudinal detent.

14. The apparatus of claim A13, wherein the first mode is only available when a measured ground speed is less than a predetermined ground speed.

15. The apparatus of claim A1, further comprising:

a transition button configured to switch flight control to a cruise mode for an outbound transition when the transition button is moved forward, and a deceleration mode for an inbound transition when the transition button is moved back.

16. The apparatus of claim A1, further comprising:

a first thumb inceptor associated with the first inceptor; and a second thumb inceptor associated with the second inceptor.

Clause Set B:

1. A simulator apparatus comprising:

a processor;

a first inceptor, communicatively coupled to the processor, the first inceptor configured to accept longitudinal and lateral linear movements as manual input and provide corresponding signals to the processor; and a second inceptor, communicatively coupled to the processor, the second inceptor configured to accept longitudinal and lateral linear movements as manual input and provide corresponding signals to the processor;

wherein the processor is configured to control a heading of an aircraft using a signal received from the second inceptor corresponding to lateral linear movement of the second inceptor.

2. The apparatus of claim B1, wherein the processor is configured to use a control law to control the heading of the aircraft.

3. The apparatus of claim B1, wherein the processor is configured to control the heading of the aircraft based on a determined phase of flight.

4. The apparatus of claim B3, wherein in a vertical takeoff or landing phase of flight, the processor is configured to control the heading via a yaw axis of the aircraft using the signal received from the second inceptor corresponding to lateral linear movement of the second inceptor.

5. The apparatus of claim B1, wherein the processor is configured to control an altitude of the aircraft using the signal received from the second inceptor corresponding to longitudinal linear movement of the second inceptor.

6. The apparatus of claim B5, wherein the first inceptor is a left inceptor and the second inceptor is a right inceptor relative to a pilot of the aircraft.

7. The apparatus of claim B1, wherein the second inceptor is not configured to accept a twisting movement as manual input.

8. The apparatus of claim B1, wherein the second inceptor is not configured to provide a signal to the processor corresponding to a twisting movement as manual input.

9. The apparatus of claim B1, wherein the processor is not configured to control the heading of the aircraft using a signal received from the second inceptor corresponding to a twisting movement of the second inceptor.

10. The apparatus of claim B1, wherein the flight control apparatus does not include foot pedals configured to control the heading via a yaw axis of the aircraft in flight.

11. The apparatus of claim B3, further comprising:

at least one sensor configured to measure an airspeed of the aircraft, wherein the at least one sensor is communicatively coupled to the at least one processor to determine the phase of flight of a plurality of phases of flight based on the measured airspeed of the aircraft, and wherein the plurality of phases of flight include hover when the measured airspeed is less than a first predetermined airspeed, transition when the measured airspeed is greater than or equal to the first predetermined airspeed and less than a second predetermined airspeed, and conventional take-off and landing (CTOL) when the measured airspeed is greater than or equal to the second predetermined airspeed.

12. The apparatus of claim B1, wherein the processor is further configured to use a control law to control the aircraft based on a determined phase of flight such that: when the determined phase of flight is hover, a longitudinal linear movement of the first inceptor provides a corresponding signal to the processor for controlling a longitudinal inertial speed of the aircraft and a lateral linear movement of the first inceptor provides a corresponding signal to the processor for controlling a lateral inertial speed of the aircraft, and a longitudinal linear movement of the second inceptor provides a corresponding signal to the processor for controlling a vertical speed of the aircraft and a lateral linear movement of the second inceptor provides a corresponding signal to the processor for controlling a hover turn-rate of the aircraft; and when the determined phase of flight is transition or CTOL, a longitudinal linear movement of the first inceptor provides a corresponding signal to the processor for controlling an airspeed rate of the aircraft and a lateral linear movement of the first inceptor provides a corresponding signal to the processor for controlling a lateral air-relative speed of the aircraft, and a longitudinal linear movement of the second inceptor provides a corresponding signal to the processor for controlling a flight path angle rate of the aircraft and a lateral linear movement of the second inceptor provides a corresponding signal to the processor for controlling a banked turn-rate of the aircraft.

13. The apparatus of claim B1, wherein the at least one processor is configured to determine a response mode and output an inceptor command based on the determined response mode, including:

when the determined response mode is a first mode and the first inceptor is placed in detent longitudinally, the output inceptor command is to hold a current longitudinal position of the aircraft; and when the determined response mode is a second mode and the first inceptor is placed in detent longitudinally, the output inceptor command is to maintain an airspeed at which the aircraft was moving prior to placing the first inceptor in longitudinal detent.

14. The apparatus of claim B13, wherein the first mode is only available when a measured ground speed is less than a predetermined ground speed.

15. The apparatus of claim B1, further comprising: a transition button configured to switch flight control to a cruise mode for an outbound transition when the transition button is moved forward, and a deceleration mode for an inbound transition when the transition button is moved back.

16. The apparatus of claim B1, further comprising: a first thumb inceptor associated with the first inceptor; and a second thumb inceptor associated with the second inceptor.

Clause Set C:

1. A video game apparatus comprising:

a processor;

a first inceptor, communicatively coupled to the processor, the first inceptor configured to accept longitudinal and lateral linear movements as manual input and provide corresponding signals to the processor; and a second inceptor, communicatively coupled to the processor, the second inceptor configured to accept longitudinal and lateral linear movements as manual input and provide corresponding signals to the processor;

wherein the processor is configured to control a heading of an aircraft using a signal received from the second inceptor corresponding to lateral linear movement of the second inceptor.

2. The apparatus of claim C1, wherein the processor is configured to use a control law to control the heading of the aircraft.

3. The apparatus of claim C1, wherein the processor is configured to control the heading of the aircraft based on a determined phase of flight.

4. The apparatus of claim C3, wherein in a vertical takeoff or landing phase of flight, the processor is configured to control the heading via a yaw axis of the aircraft using the signal received from the second inceptor corresponding to lateral linear movement of the second inceptor.

5. The apparatus of claim C1, wherein the processor is configured to control an altitude of the aircraft using the signal received from the second inceptor corresponding to longitudinal linear movement of the second inceptor.

6. The apparatus of claim C5, wherein the first inceptor is a left inceptor and the second inceptor is a right inceptor relative to a pilot of the aircraft.

7. The apparatus of claim C1, wherein the second inceptor is not configured to accept a twisting movement as manual input.

8. The apparatus of claim C1, wherein the second inceptor is not configured to provide a signal to the processor corresponding to a twisting movement as manual input.

9. The apparatus of claim C1, wherein the processor is not configured to control the heading of the aircraft using a signal received from the second inceptor corresponding to a twisting movement of the second inceptor.

10. The apparatus of claim C1, wherein the flight control apparatus does not include foot pedals configured to control the heading via a yaw axis of the aircraft in flight.

11. The apparatus of claim C3, further comprising:

at least one sensor configured to measure an airspeed of the aircraft, wherein the at least one sensor is communicatively coupled to the at least one processor to determine the phase of flight of a plurality of phases of flight based on the measured airspeed of the aircraft, and wherein the plurality of phases of flight include hover when the measured airspeed is less than a first predetermined airspeed, transition when the measured airspeed is greater than or equal to the first predetermined airspeed and less than a second predetermined airspeed, and conventional take-off and landing (CTOL) when the measured airspeed is greater than or equal to the second predetermined airspeed.

12. The apparatus of claim C1, wherein the processor is further configured to use a control law to control the aircraft based on a determined phase of flight such that: when the determined phase of flight is hover, a longitudinal linear movement of the first inceptor provides a corresponding signal to the processor for controlling a longitudinal inertial speed of the aircraft and a lateral linear movement of the first inceptor provides a corresponding signal to the processor for controlling a lateral inertial speed of the aircraft, and a longitudinal linear movement of the second inceptor provides a corresponding signal to the processor for controlling a vertical speed of the aircraft and a lateral linear movement of the second inceptor provides a corresponding signal to the processor for controlling a hover turn-rate of the aircraft; and when the determined phase of flight is transition or conventional take-off and landing (CTOL), a longitudinal linear movement of the first inceptor provides a corresponding signal to the processor for controlling an airspeed rate of the aircraft and a lateral linear movement of the first inceptor provides a corresponding signal to the processor for controlling a lateral air-relative speed of the aircraft, and a longitudinal linear movement of the second inceptor provides a corresponding signal to the processor for controlling a flight path angle rate of the aircraft and a lateral linear movement of the second inceptor provides a corresponding signal to the processor for controlling a banked turn-rate of the aircraft.

13. The apparatus of claim C1, wherein the at least one processor is configured to determine a response mode and output an inceptor command based on the determined response mode, including:

when the determined response mode is a first mode and the first inceptor is placed in detent longitudinally, the output inceptor command is to hold a current longitudinal position of the aircraft; and when the determined response mode is a second mode and the first inceptor is placed in detent longitudinally, the output inceptor command is to maintain an airspeed at which the aircraft was moving prior to placing the first inceptor in longitudinal detent.

14. The apparatus of claim C13, wherein the first mode is only available when a measured ground speed is less than a predetermined ground speed.

15. The apparatus of claim C1, further comprising:

a transition button configured to switch flight control to a cruise mode for an outbound transition when the transition button is moved forward, and a deceleration mode for an inbound transition when the transition button is moved back.

16. The apparatus of claim C1, further comprising:

a first thumb inceptor associated with the first inceptor; and a second thumb inceptor associated with the second inceptor.

Clause Set D:

1. A method of controlling an aircraft, the method comprising:

receiving signals corresponding to longitudinal and lateral linear movements of a first inceptor and a second inceptor, wherein the first inceptor and the second inceptor are configured to accept longitudinal and lateral linear movements as manual input; and controlling movement of the aircraft based on the received signals, wherein controlling a heading of the aircraft is based on a signal corresponding to lateral linear movement of the second inceptor.

2. The method of claim D1, wherein controlling heading of the aircraft comprises using a control law.

3. The method of claim D1, wherein controlling heading of the aircraft is further based on a determined phase of flight.

4. The method of claim D3, the method further comprising:

when in a vertical takeoff or landing phase of flight, controlling the heading via a yaw axis of the aircraft is based on a signal corresponding to lateral linear movement of the second inceptor.

5. The method of claim D1, the method further comprising:

receiving a movement signal from the second inceptor, wherein the movement signal corresponds to a longitudinal linear movement of the second inceptor; and controlling an altitude of the aircraft based on the received movement signal.

6. The method of claim D1, the method further comprising:

receiving a mode signal to switch flight control from a first mode to a second mode; and switching flight control from the first mode to the second mode, wherein the first mode is a hover mode and the second mode is a cruise mode.

7. The method of claim D1, the method further comprising:

receiving a mode signal to switch flight control from a first mode to a third mode; and switching flight control from the first mode to the second mode, wherein the first mode is a hover mode and the third mode is a deceleration mode.

8. The method of claim D1, the method further comprising:

determining an airspeed of the aircraft; and determining a phase of flight of a plurality of phases of flight based on the determined airspeed of the aircraft, wherein the plurality of phases of flight include hover when the measured airspeed is less than a first predetermined airspeed, transition when the measured airspeed is greater than or equal to the first predetermined airspeed and less than a second predetermined airspeed, and conventional take-off and landing (CTOL) when the measured airspeed is greater than or equal to the second predetermined airspeed.

9. The method of claim D1, wherein controlling movement of the aircraft based on the received signals further comprises:

using a control law based on a determined phase of flight, wherein:

when the determined phase of flight is hover, controlling a longitudinal inertial speed is based on signals corresponding to longitudinal linear movements of the first inceptor and controlling a lateral inertial speed is based on signals corresponding to lateral linear movements of the first inceptor, and controlling a vertical speed is based on signals corresponding to longitudinal linear movements of the second inceptor and controlling a hover turn-rate is based on signals corresponding to lateral linear movements of the second inceptor; and when the determined phase of flight is transition or conventional take-off and landing (CTOL), controlling an airspeed rate is based on signals corresponding to longitudinal linear movements of the first inceptor and controlling a lateral air-relative speed is based on signals corresponding to lateral linear movements of the first inceptor, and controlling a flight path angle rate is based on signals corresponding to longitudinal linear movements of the second inceptor and controlling a banked turn-rate is based on signals corresponding to lateral linear movements of the second inceptor.

10. The method of claim D1, the method further comprising:

receiving a transfer control signal; and in response to the received transfer control signal, transferring command control from at least one of the first inceptor or the second inceptor to at least one of a third inceptor or a fourth inceptor.

11. The method of claim D1, wherein the second inceptor is not configured to accept a twisting movement as manual input.

12. The method of claim D1, wherein controlling the heading of the aircraft is not based on a signal corresponding to a twisting movement of the second inceptor.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims.

The invention claimed is:

1. A video game apparatus, comprising:

a processor;

a first inceptor, communicatively coupled to the processor, the first inceptor configured to accept longitudinal and lateral linear movements as manual input and provide corresponding signals to the processor; and a second inceptor, communicatively coupled to the processor, the second inceptor configured to accept longitudinal and lateral linear movements as manual input and provide corresponding signals to the processor;

wherein the processor is configured to control a heading of an aircraft in a video game using a signal received from the second inceptor corresponding to lateral linear movement of the second inceptor, wherein the processor is configured to control the heading of the aircraft based on a determined phase of flight of the aircraft.

2. The apparatus of claim 1, wherein the processor is configured to use a control law to control the heading of the aircraft.

3. The apparatus of claim 1, wherein in a vertical takeoff or landing phase of flight, the processor is configured to control the heading via a yaw axis of the aircraft using the signal received from the second inceptor corresponding to lateral linear movement of the second inceptor.

4. The apparatus of claim 1, wherein the processor is configured to control an altitude of the aircraft using the signal received from the second inceptor corresponding to longitudinal linear movement of the second inceptor.

5. The apparatus of claim 4, wherein the first inceptor is a left inceptor and the second inceptor is a right inceptor relative to a pilot of the aircraft.

6. The apparatus of claim 1, wherein the second inceptor is not configured to accept a twisting movement as manual input.

7. The apparatus of claim 1, wherein the second inceptor is not configured to provide a signal to the processor corresponding to a twisting movement as manual input.

8. The apparatus of claim 1, wherein the processor is not configured to control the heading of the aircraft using a signal received from the second inceptor corresponding to a twisting movement of the second inceptor.

9. The apparatus of claim 1, wherein the video game apparatus does not include foot pedals configured to control the heading via a yaw axis of the aircraft in flight.

10. The apparatus of claim 1, wherein the processor is configured to determine the phase of flight of a plurality of phases of flight based on an airspeed of the aircraft; and wherein the plurality of phases of flight include hover when the airspeed is less than a first predetermined airspeed, transition when the airspeed is greater than or equal to the first predetermined airspeed and less than a second predetermined airspeed, and conventional take-off and landing (CTOL) when the airspeed is greater than or equal to the second predetermined airspeed.

11. The apparatus of claim 1, wherein the processor is further configured to use a control law to control the aircraft based on a determined phase of flight of the aircraft such that:

when the determined phase of flight is hover, a longitudinal linear movement of the first inceptor provides a corresponding signal to the processor for controlling a longitudinal inertial speed of the aircraft and a lateral linear movement of the first inceptor provides a corresponding signal to the processor for controlling a lateral inertial speed of the aircraft, and a longitudinal linear movement of the second inceptor provides a corresponding signal to the processor for controlling a vertical speed of the aircraft and a lateral linear movement of the second inceptor provides a corresponding signal to the processor for controlling a hover turn-rate of the aircraft; and when the determined phase of flight is transition or conventional take-off and landing (CTOL), a longitudinal linear movement of the first inceptor provides a corresponding signal to the processor for controlling an airspeed rate of the aircraft and a lateral linear movement of the first inceptor provides a corresponding signal to the processor for controlling a lateral air-relative speed of the aircraft, and a longitudinal linear movement of the second inceptor provides a corresponding signal to the processor for controlling a flight path angle rate of the aircraft and a lateral linear movement of the second inceptor provides a corresponding signal to the processor for controlling a banked turn-rate of the aircraft.

12. The apparatus of claim 1, wherein the processor is configured to determine a response mode and output an inceptor command based on the determined response mode, including:

when the determined response mode is a first mode and the first inceptor is placed in detent longitudinally, the output inceptor command is to hold a current longitudinal position of the aircraft; and when the determined response mode is a second mode and the first inceptor is placed in detent longitudinally, the output inceptor command is to maintain an airspeed at which the aircraft was moving prior to placing the first inceptor in longitudinal detent.

13. The apparatus of claim 12, wherein the first mode is only available when a ground speed of the aircraft is less than a predetermined ground speed.

14. The apparatus of claim 1, further comprising:

a transition button configured to switch flight control to a cruise mode for an outbound transition when the transition button is moved forward, and a deceleration mode for an inbound transition when the transition button is moved back.

15. The apparatus of claim 1, further comprising:

a first thumb inceptor associated with the first inceptor; and a second thumb inceptor associated with the second inceptor.

16. A method of controlling an aircraft in a video game, the method comprising:

receiving, via a processor, signals corresponding to longitudinal and lateral linear movements of a first inceptor and a second inceptor, wherein the first inceptor and the second inceptor are configured to accept longitudinal and lateral linear movements as manual input; and controlling, via the processor, movement of the aircraft in the video game based on the received signals, wherein controlling a heading of the aircraft is based on a signal corresponding to lateral linear movement of the second inceptor, wherein controlling heading of the aircraft is further based on a determined phase of flight.

17. The method of claim 16, wherein controlling heading of the aircraft comprises using a control law.

18. The method of claim 16, the method further comprising:

when in a vertical takeoff or landing phase of flight, controlling the heading via a yaw axis of the aircraft is based on a signal corresponding to lateral linear movement of the second inceptor.

19. The method of claim 16, the method further comprising:

receiving a movement signal from the second inceptor, wherein the movement signal corresponds to a longitudinal linear movement of the second inceptor; and controlling an altitude of the aircraft based on the received movement signal.

20. The method of claim 16, the method further comprising:

receiving a mode signal to switch flight control from a first mode to a second mode; and switching flight control from the first mode to the second mode, wherein the first mode is a hover mode and the second mode is a cruise mode.

21. The method of claim 16, the method further comprising:

receiving a mode signal to switch flight control from a first mode to a third mode; and switching flight control from the first mode to the third mode, wherein the first mode is a hover mode and the third mode is a deceleration mode.

22. The method of claim 16, the method further comprising:

determining a phase of flight of a plurality of phases of flight based on an airspeed of the aircraft, wherein the plurality of phases of flight include hover when the airspeed is less than a first predetermined airspeed, transition when the airspeed is greater than or equal to the first predetermined airspeed and less than a second predetermined airspeed, and conventional take-off and landing (CTOL) when the airspeed is greater than or equal to the second predetermined airspeed.

23. The method of claim 16, wherein controlling movement of the aircraft based on the received signals further comprises:

using a control law based on a determined phase of flight, wherein:

when the determined phase of flight is hover, controlling a longitudinal inertial speed is based on signals corresponding to longitudinal linear movements of the first inceptor and controlling a lateral inertial speed is based on signals corresponding to lateral linear movements of the first inceptor, and controlling a vertical speed is based on signals corresponding to longitudinal linear movements of the second inceptor and controlling a hover turn-rate is based on signals corresponding to lateral linear movements of the second inceptor; and when the determined phase of flight is transition or conventional take-off and landing (CTOL), controlling an airspeed rate is based on signals corresponding to longitudinal linear movements of the first inceptor and controlling a lateral air-relative speed is based on signals corresponding to lateral linear movements of the first inceptor, and controlling a flight path angle rate is based on signals corresponding to longitudinal linear movements of the second inceptor and controlling a banked turn-rate is based on signals corresponding to lateral linear movements of the second inceptor.

24. The method of claim 16, the method further comprising:

receiving a transfer control signal; and in response to the received transfer control signal, transferring command control from at least one of the first inceptor or the second inceptor to at least one of a third inceptor or a fourth inceptor.

25. The method of claim 16, wherein the second inceptor is not configured to accept a twisting movement as manual input.

26. The method of claim 16, wherein controlling the heading of the aircraft is not based on a signal corresponding to a twisting movement of the second inceptor.

27. A video game apparatus, comprising:

a processor;

a first inceptor, communicatively coupled to the processor, the first inceptor configured to accept longitudinal and lateral linear movements as manual input and provide corresponding signals to the processor; and a second inceptor, communicatively coupled to the processor, the second inceptor configured to accept longitudinal and lateral linear movements as manual input and provide corresponding signals to the processor;

wherein the processor is configured to control a heading of an aircraft in a video game using a signal received from the second inceptor corresponding to lateral linear movement of the second inceptor, and wherein the processor is not configured to control the heading of the aircraft using a signal received from the second inceptor corresponding to a twisting movement of the second inceptor.

28. The apparatus of claim 27, wherein the processor is configured to use a control law to control the heading of the aircraft.

29. The apparatus of claim 27, wherein the processor is configured to control the heading of the aircraft based on a determined phase of flight of the aircraft.

30. The apparatus of claim 29, wherein in a vertical takeoff or landing phase of flight, the processor is configured to control the heading via a yaw axis of the aircraft using the signal received from the second inceptor corresponding to lateral linear movement of the second inceptor.

31. The apparatus of claim 27, wherein the processor is configured to control an altitude of the aircraft using the signal received from the second inceptor corresponding to longitudinal linear movement of the second inceptor.

32. The apparatus of claim 31, wherein the first inceptor is a left inceptor and the second inceptor is a right inceptor relative to a pilot of the aircraft.

33. The apparatus of claim 27, wherein the second inceptor is not configured to accept a twisting movement as manual input.

34. The apparatus of claim 27, wherein the second inceptor is not configured to provide a signal to the processor corresponding to a twisting movement as manual input.

35. The apparatus of claim 27, wherein the video game apparatus does not include foot pedals configured to control the heading via a yaw axis of the aircraft in flight.

36. The apparatus of claim 29, wherein the processor is configured to determine the phase of flight of a plurality of phases of flight based on an airspeed of the aircraft; and wherein the plurality of phases of flight include hover when the airspeed is less than a first predetermined airspeed, transition when the airspeed is greater than or equal to the first predetermined airspeed and less than a second predetermined airspeed, and conventional take-off and landing (CTOL) when the airspeed is greater than or equal to the second predetermined airspeed.

37. The apparatus of claim 27, wherein the processor is further configured to use a control law to control the aircraft based on a determined phase of flight of the aircraft such that:

when the determined phase of flight is hover, a longitudinal linear movement of the first inceptor provides a corresponding signal to the processor for controlling a longitudinal inertial speed of the aircraft and a lateral linear movement of the first inceptor provides a corresponding signal to the processor for controlling a lateral inertial speed of the aircraft, and a longitudinal linear movement of the second inceptor provides a corresponding signal to the processor for controlling a vertical speed of the aircraft and a lateral linear movement of the second inceptor provides a corresponding signal to the processor for controlling a hover turn-rate of the aircraft; and when the determined phase of flight is transition or conventional take-off and landing (CTOL), a longitudinal linear movement of the first inceptor provides a corresponding signal to the processor for controlling an airspeed rate of the aircraft and a lateral linear movement of the first inceptor provides a corresponding signal to the processor for controlling a lateral air-relative speed of the aircraft, and a longitudinal linear movement of the second inceptor provides a corresponding signal to the processor for controlling a flight path angle rate of the aircraft and a lateral linear movement of the second inceptor provides a corresponding signal to the processor for controlling a banked turn-rate of the aircraft.

38. The apparatus of claim 27, wherein the processor is configured to determine a response mode and output an inceptor command based on the determined response mode, including:

when the determined response mode is a first mode and the first inceptor is placed in detent longitudinally, the output inceptor command is to hold a current longitudinal position of the aircraft; and when the determined response mode is a second mode and the first inceptor is placed in detent longitudinally, the output inceptor command is to maintain an airspeed at which the aircraft was moving prior to placing the first inceptor in longitudinal detent.

39. The apparatus of claim 38, wherein the first mode is only available when a ground speed of the aircraft is less than a predetermined ground speed.

40. The apparatus of claim 27, further comprising:

a transition button configured to switch flight control to a cruise mode for an outbound transition when the transition button is moved forward, and a deceleration mode for an inbound transition when the transition button is moved back.

41. The apparatus of claim 27, further comprising:

a first thumb inceptor associated with the first inceptor; and a second thumb inceptor associated with the second inceptor.

42. A method of controlling an aircraft in a video game, the method comprising:

receiving, via a processor, signals corresponding to longitudinal and lateral linear movements of a first inceptor and a second inceptor, wherein the first inceptor and the second inceptor are configured to accept longitudinal and lateral linear movements as manual input; and controlling, via the processor, movement of the aircraft in the video game based on the received signals, wherein controlling a heading of the aircraft is based on a signal corresponding to lateral linear movement of the second inceptor, wherein controlling the heading of the aircraft is not based on a signal corresponding to a twisting movement of the second inceptor.

43. The method of claim 42, wherein controlling heading of the aircraft comprises using a control law.

44. The method of claim 42, wherein controlling heading of the aircraft is further based on a determined phase of flight.

45. The method of claim 44, the method further comprising:

when in a vertical takeoff or landing phase of flight, controlling the heading via a yaw axis of the aircraft is based on a signal corresponding to lateral linear movement of the second inceptor.

46. The method of claim 42, the method further comprising:

receiving a movement signal from the second inceptor, wherein the movement signal corresponds to a longitudinal linear movement of the second inceptor; and controlling an altitude of the aircraft based on the received movement signal.

47. The method of claim 42, the method further comprising:

receiving a mode signal to switch flight control from a first mode to a second mode; and switching flight control from the first mode to the second mode, wherein the first mode is a hover mode and the second mode is a cruise mode.

48. The method of claim 42, the method further comprising:

receiving a mode signal to switch flight control from a first mode to a third mode; and switching flight control from the first mode to the third mode, wherein the first mode is a hover mode and the third mode is a deceleration mode.

* * * * *